(12) United States Patent
Tu et al.

(10) Patent No.: US 7,996,869 B2
(45) Date of Patent: Aug. 9, 2011

(54) AUTOMATICALLY RECONFIGURABLE MULTIMEDIA SYSTEM WITH INTERCHANGEABLE PERSONALITY ADAPTERS

(75) Inventors: Edgar Tu, Poway, CA (US); David Boyden, Escondido, CA (US); Takashi Hironaka, San Diego, CA (US); Thomas Dawson, Escondido, CA (US); George Williams, Carlsbad, CA (US); Ludovic Douillet, Escondido, CA (US); Rajesh Rao, San Marcos, CA (US); Peter Rae Shintani, San Diego, CA (US); Djung Nguyen, San Diego, CA (US); Milton Frazier, San Marcos, CA (US); Ian Charles Matthews, Escondido, CA (US); Behram Mario Dacosta, San Diego, CA (US); Robert Hardacker, Escondido, CA (US); Nicholas James Colsey, Del Mar, CA (US); Mark Hanson, San Jose, CA (US); Jason R. Meerbergen, San Diego, CA (US); Leo Mark Pedlow, Ramona, CA (US); Rolf Toft, Palo Alto, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 645 days.

(21) Appl. No.: 11/840,189

(22) Filed: Aug. 16, 2007

(65) Prior Publication Data
US 2008/0134237 A1    Jun. 5, 2008

Related U.S. Application Data

(63) Continuation-in-part of application No. 11/726,558, filed on Mar. 22, 2007, and a continuation-in-part of (Continued)

(51) Int. Cl.
*H04N 5/445* (2011.01)
*H04N 5/44* (2011.01)
(52) U.S. Cl. .......................................... 725/80; 725/152
(58) Field of Classification Search .................... None
See application file for complete search history.

(56) References Cited

U.S. PATENT DOCUMENTS 6,177,931 B1 * 1/2001 Alexander et al. .............. 725/52
(Continued)

FOREIGN PATENT DOCUMENTS
WO    2006075148 A2    7/2006

OTHER PUBLICATIONS

European Patent Office, Extended European Search Report, issued Aug. 26, 2010, EPO Application No. 07814206.4-2223 / 2052542, including claims, 12 pages.

(Continued)

*Primary Examiner* — Andrew Y Koenig
*Assistant Examiner* — Rong Le
(74) *Attorney, Agent, or Firm* — John P. O'Banion

(57) ABSTRACT

A TV-set is equipped with HDMI and USB connections that allow it to display and run audio-video content from a variety of conventional consumer devices. The TV-set is further equipped to provide a secure HDMI-USB interface that will allow the transfer of licensed high definition content and Internet subscriber services. Such secure HDMI-USB interface also enables a selection of proprietary application modules to be attached. Downloadable user interface templates, much like XML style sheets, are rendered to a user interface displayed on the screen. These are associated with corresponding thumbnails and URI's that allow a user to surf through lists and catalogs of materials, and then to play them in the appropriate formats and provide the machine with a customized controller. A remote commander is simplified, yet expanded to control all the attached devices through interactions with the user interface. The functions of the remote commander's keys change depending on where the user is navigating and what device is being controlled, similar to so-called soft-keys.

70 Claims, 8 Drawing Sheets

Related U.S. Application Data application No. 11/580,781, filed on Oct. 13, 2006, now Pat. No. 7,788,727, and a continuation-in-part of application No. 11/601,973, filed on Nov. 20, 2006, now Pat. No. 7,577,908, and a continuation-in-part of application No. 11/803,989, filed on May 16, 2007, application No. 11/840,189, which is a continuation-in-part of application No. 11/711,299, filed on Feb. 27, 2007, and a continuation-in-part of application No. 11/673,522, filed on Feb. 9, 2007, and a continuation-in-part of application No. 11/724,631, filed on Mar. 15, 2007, and a continuation-in-part of application No. 11/702,280, filed on Feb. 5, 2007, now Pat. No. 7,856,104.

(60) Provisional application No. 60/838,942, filed on Aug. 18, 2006, provisional application No. 60/838,940, filed on Aug. 18, 2006.

(56) References Cited

U.S. PATENT DOCUMENTS

| | | | |
|---|---|---|---|
| 6,182,094 B1 * | 1/2001 | Humpleman et al. | 715/234 |
| 6,333,750 B1 | 12/2001 | Odryna et al. | |
| 6,919,790 B2 * | 7/2005 | Kanazawa | 340/5.21 |
| 7,548,675 B2 * | 6/2009 | Tatum et al. | 385/100 |
| 7,577,908 B2 | 8/2009 | Frazier et al. | |
| 7,647,037 B2 * | 1/2010 | Ayachitula et al. | 455/414.1 |
| 2002/0047938 A1 | 4/2002 | Inoue et al. | |
| 2003/0035075 A1 * | 2/2003 | Butler et al. | 348/734 |
| 2003/0223377 A1 * | 12/2003 | Simmons et al. | 370/254 |
| 2005/0105007 A1 | 5/2005 | Christian | |
| 2006/0041912 A1 * | 2/2006 | Kuhns | 725/71 |
| 2006/0117371 A1 * | 6/2006 | Margulis | 725/131 |
| 2006/0282849 A1 * | 12/2006 | Lin | 725/38 |
| 2007/0098179 A1 * | 5/2007 | Nave | 380/286 |
| 2007/0250872 A1 * | 10/2007 | Dua | 725/81 |
| 2008/0046943 A1 | 2/2008 | Colsey et al. | |
| 2008/0092246 A1 | 4/2008 | Shintani | |
| 2008/0186403 A1 | 8/2008 | Douillet | |
| 2008/0204984 A1 | 8/2008 | Dawson | |
| 2008/0212940 A1 * | 9/2008 | Tan et al. | 386/124 |
| 2008/0228963 A1 | 9/2008 | Hironaka et al. | |
| 2008/0235736 A1 | 9/2008 | Dawson et al. | |

OTHER PUBLICATIONS

The First Office Action, Chinese Patent Office, Patent Application No. 200780030722.X, issued Jun. 2, 2010 (translation) with claims, 22 sheets; national phase of PCT/US2007/076178 which is a counterpart of U.S. Appl. No. 11/840,189.

* cited by examiner

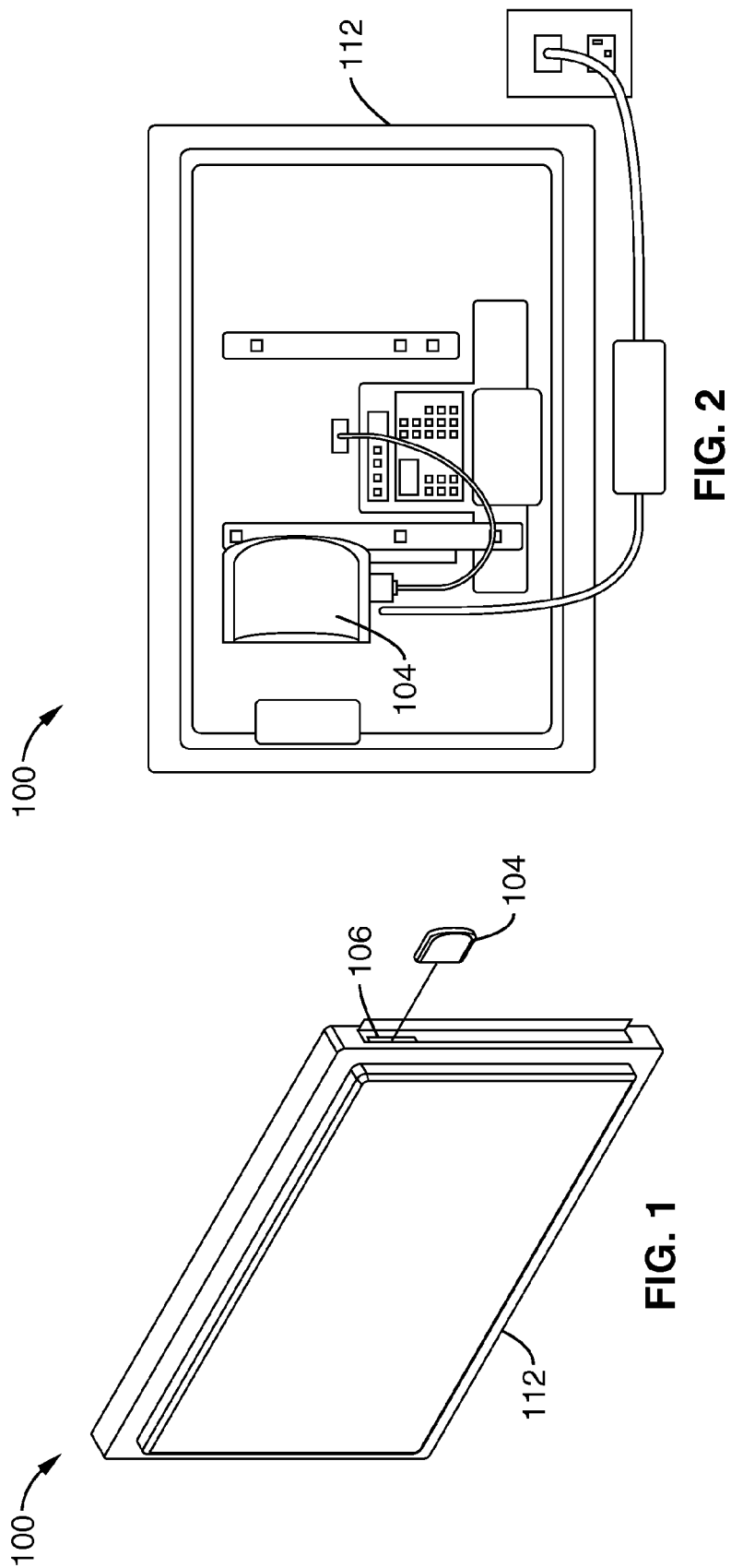

AUTOMATICALLY RECONFIGURABLE MULTIMEDIA SYSTEM WITH INTERCHANGEABLE PERSONALITY ADAPTERS

CROSS-REFERENCE TO RELATED APPLICATIONS

This application claims priority from U.S. provisional patent application Ser. No. 60/838,942, filed on Aug. 18, 2006, incorporated herein by reference in its entirety. This application is a continuation-in-part of U.S. patent application Ser. No. 11/726,558 filed on Mar. 22, 2007, incorporated herein by reference in its entirety. This application is a continuation-in-part of U.S. patent application Ser. No. 11/580,781 filed on Oct. 13, 2006, incorporated herein by reference in its entirety. This application is a continuation-in-part of U.S. patent application Ser. No. 11/601,973 filed on Nov. 20, 2006, incorporated herein by reference in its entirety. This application is a continuation-in-part of U.S. patent application Ser. No. 11/803,989 filed in May 16, 2007, incorporated herein by reference in its entirety, which claims priority to U.S. provisional patent application Ser. No. 60/838,940 filed on Aug. 18, 2006, incorporated herein by reference in its entirety. This application is a continuation-in-part of U.S. patent application Ser. No. 11/711,299 filed on Feb. 27, 2007, incorporated herein by reference in its entirety. This application is a continuation-in-part of U.S. patent application Ser. No. 11/673,522 filed on Feb. 9, 2007, incorporated herein by reference in its entirety. This application is a continuation-in-part of U.S. patent application Ser. No. 11/724,631 filed on Mar. 15, 2007, incorporated herein by reference in its entirety. This application is a continuation-in-part of U.S. patent application Ser. No. 11/702,280 filed on Feb. 5, 2007, incorporated herein by reference in its entirety. Priority is claimed to each of the foregoing applications.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates generally to television receivers, and more particularly to audio-video appliances able to automatically configure themselves and adapt to a variety of specialized personality cards for downloadable and attachable audio-video content.

2. Description of Related Art

Audio-video content is available in a very wide range of subjects, formats, and sources. The home television receiver is a natural way for consumers to access and view the Internet, TV programs off-the-air and on cable, home video, personal photographs, web-pages, movie and other program downloads, games, etc. Many TV receivers have a channel tuner built in, and also have a number of auxiliary video and audio inputs available for games, cable tuners, DVD players, etc. Connector standards include AVI, HDMI, VGA, USB, FIREWIRE, and many others.

Navigating through all these audio-video sources is one problem, and actually playing them is another. To further complicate the situation for the consumer, each device usually has a specialized and incompatible remote commander. Even "universal" remotes don't incorporate the entire user interface that may be distinguishing one brand over another. There are so many incompatible audio and video formats and communications protocols, with specialized equipment and adapters needed for each that a tangle of wires and confusion result on how to select and operate it all.

High definition (HD) video format source content is now becoming widely available on cable TV, satellite TV, on-air broadcasts, DVD disc, etc. Much of this HD content is copyrighted, and a great deal of technical and legal effort goes into protecting the intellectual property. HD copyrighted content is especially sensitive, because high quality copies can be readily made from HD in the clear, and such home made copies will present as well as licensed manufactured copies.

Composite video, component video, DVI, and now HDMI interfaces are common ways that TV monitors are used in homes to receive their video input signals to display. These interfaces are traditionally in-the-clear and easy places to intercept copyrighted content and then use it to generate un-licensed copies. DVD manufacturers and cable operators, for example, have gone to extraordinary lengths to encrypt and scramble their content so unlicensed copies could not be made. But once the licensed content has been decoded and translated, it makes no sense to allow it to come out in-the-clear for a home TV monitor to display.

CableLabs® is a consortium of North American cable operators that manages the CableCARD™-Host Interface License Agreement (CHILA) specifications and associated intellectual property. The CableCARD Host Interface specification defines the interface between a digital cable receiver or set-top box, and a CableCARD module distributed by a cable operator. Such provides a standard platform for two-way interactive devices. By signing an agreement, companies are able to build set-top boxes, customer premises equipment, and other products with a CableCARD™ removable security interface. The products can receive and display advanced cable services, e.g., program guides and video-on-demand (VOD). CHILA is a key component of the effort initiated by North American cable operators to deploy more innovative cable devices in their market. Additional interactive services include, for example, VOD and electronic program guide (EPG).

The high definition multimedia interface (HDMI) was developed for high resolution digital TV's. HDMI provides HD video and advanced audio interfaces in one simplified connector, unlike the earlier digital visual interface (DVI) that was developed primarily for computers and did not envision needing to process audio data. Early TV's, and especially those with DVI connectors, required the audio to be cabled with standard left and right analog channels using RCA-style audio jacks. HDMI and DVI are compatible with high-bandwidth digital content protection (HDCP) for digital multimedia. HDMI supports advanced multi-channel digital audio transfers, like 5.1 Dolby.

HDMI further supports consumer electronics control (CEC), so a single remote control can be used to control both the TV and the source device. CEC is an optional protocol used in HDMI systems that allows HDMI devices to pass control functions along to all the devices within the system. For example, allowing one remote commander to be used for all devices. But, CEC was designed to operate at low speeds with minimal processing and memory overhead. More ambitious control schemes get starved for bandwidth with CEC. Supplementing the HDMI connection with a universal serial bus (USB), for example, can improve high-bandwidth back channel communication as well as speed the transmission of certain control commands. A secure connection is needed when proprietary devices are being interconnected, and licensed content is being transferred over the interfaces. The second path USB could allow a PC to spoof the TV, and thus obtain sensitive information on the details of the data exchange between a set-top-box, or other content source, and a TV.

What is needed is multimedia appliance that can self-adapt and configure itself to the kinds of formats a consumer would want to access, while maintaining substantial protections for the licensed material that consumer would be viewing.

BRIEF SUMMARY OF THE INVENTION

By way of example, and not of limitation, the present invention pertains generally to a system that includes a multimedia appliance, such as a television (TV), and one or more personality adapters that enhance the functionality of the TV. The personality adapters are interchangeable and physically connect to the TV through a slot, docking port, or the like. The system also includes a secure communications interface between the TV and the personality adapters.

A selection of personality adapters provide for specialized interfaces and access to features which include, but are not limited to, Internet services, mass memory storage, cable TV, off-the-air broadcasts, wireless networking, and personal computing. In one embodiment, the TV automatically reconfigures itself when a personality adapter is connected and provides the user with menus and remote control functionality that corresponds to the features provided by the personality adapter. An example would be providing user interface renderings suitable to the kind and format of audio-video source materials being accessed. In one embodiment, both the TV and personality adapters cooperate in authorizing multimedia content transfers across the secure communications interface, and thus will prevent unlicensed materials from being output by the personality adapter and/or being accepted by the TV.

Accordingly, an aspect of the invention is an automatically reconfigurable multimedia system. In one embodiment, the system includes (i) a first device having an interface configured for receiving audio-video content from a second device, for receiving a configuration template from the second device, and for communicating with the second device, and having a video display and an audio output, (ii) a second device having an interface configured for providing audio-video content to the first device, for providing the configuration template to the first device, and for communicating with the first device, (iii) where the first device further includes a configuration rendering engine for generating a user interface on the video display based on information contained in the configuration template.

Another aspect of the invention is an automatically reconfigurable television apparatus. In one embodiment, the apparatus includes (i) a first interface over which audio-video content can be received from an external device, (ii) a second interface paired with the first interface which enables communication with the external device for controlling operation of the external device through the television apparatus, (iii) a dynamic menu that automatically reconfigures in response to connection of the external device to the television apparatus and through which operation of the external device is controlled and audio-video content from the external device is accessed, and (iv) a configuration rendering engine that receives a configuration template from the external device and controls reconfiguration of the dynamic menu.

Another aspect of the invention is a personality adapter device for use with a television apparatus. In one embodiment, the device includes (i) a first interface over which audio-video content can be transferred to the television apparatus, (ii) a second interface paired with the first interface which enables communication with the television apparatus for controlling operation of the device through the television apparatus, (iii) a configuration template stored in memory in the device, (iv) wherein the configuration template can be transferred to the television apparatus over at least one of the interfaces for automatic reconfiguration of a menu in the television apparatus in response to connection of the device to the television apparatus, (v) and wherein operation of the device can be controlled and audio-video content from the device can be accessed through said menu.

Another aspect of the invention is an audio-video system. In one embodiment, the system includes (i) a television set with a video display screen, audio circuits, a main menu, and a remote commander, (ii) a high definition multimedia interface (HDMI) interface for the television set through which video content can be accepted for said video display screen, (iii) a TV-set adapter for connection to the HDMI interface, and for providing said video content according to user selections with the remote commander, and for making automatic adjustments to said main menu, and (iv) a user interface for rendering on the video display screen and providing for a look and feel described in a user interface template forwarded by the TV-set adapter that was associated with a particular video content.

Another aspect of the invention is an Internet services network that provides access for the TV and Internet personality adapter to on-line resources. Such Internet services network registers and supervises its users, catalogs and stores all the audio-video content, provides lists and thumbnails to surfers/shoppers, and sources the user interface templates appropriate for each audio-video content that will enable the rendering of a suitable user interface at the TV.

Another aspect of the invention is a TV equipped with HDMI and USB connections that allow it to display and run multimedia content from a variety of conventional consumer devices. In one embodiment, the TV is further equipped to provide a secure HDMI-USB interface that will allow the transfer of licensed high definition content and Internet subscriber services. Such secure HDMI-USB interface also enables a selection of proprietary application adapters to be attached. In one embodiment, downloadable user interface templates, much like XML style sheets, are rendered to a user interface displayed on the screen. These are associated with corresponding thumbnails and uniform resource indicators (URI's) that allow a user to surf through lists and catalogs of materials, and then to play them in the appropriate formats and provide the machine with a customized controller. A remote commander is simplified, yet expanded to control all the attached devices through interactions with the user interface. The functions of the remote commander's keys change depending on where the user is navigating and what device is being controlled, similar to so-called soft-keys.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is an illustration of an embodiment of a multimedia system according to the present invention in which a set-back type personality adapter is connected to a television for expanding the functionality of the television.

FIG. 2 is an illustration of an embodiment of a multimedia system according to the present invention in which a card-type personality adapter is connected to a television for expanding the functionality of the television.

Figure 6:
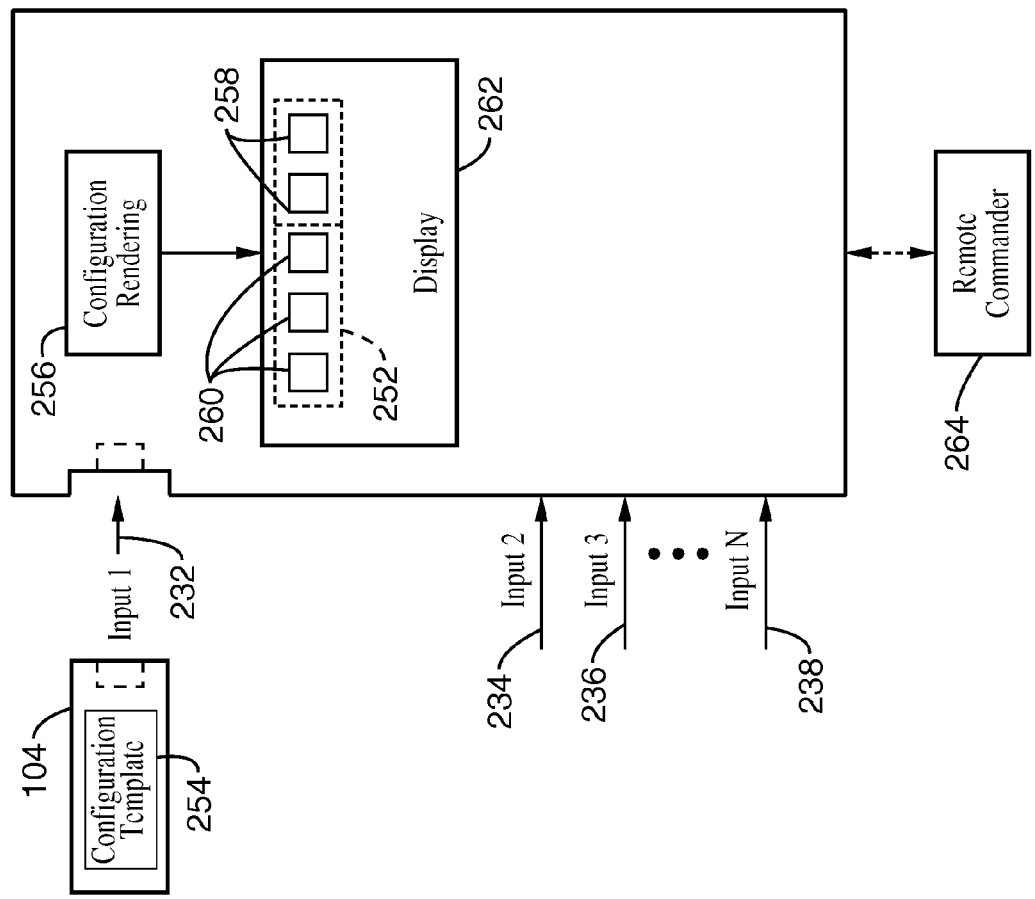

FIG. 6 schematically illustrates a menu system according to an embodiment of the invention.

Figure 7:
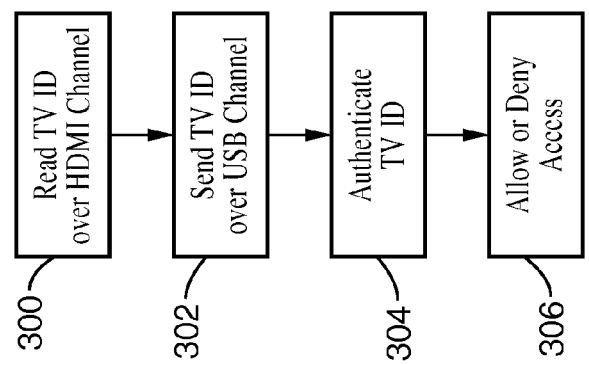

FIG. 7 is a flow diagram of an embodiment of a method of verifying that the HDMI and USB channels of a personality adapter are connected to the same TV.

Figure 8:
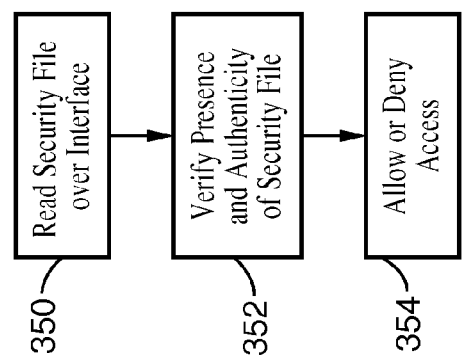

FIG. 8 is a flow diagram of an embodiment of a method for verifying that a personality adapter is authentic.

Figure 3:
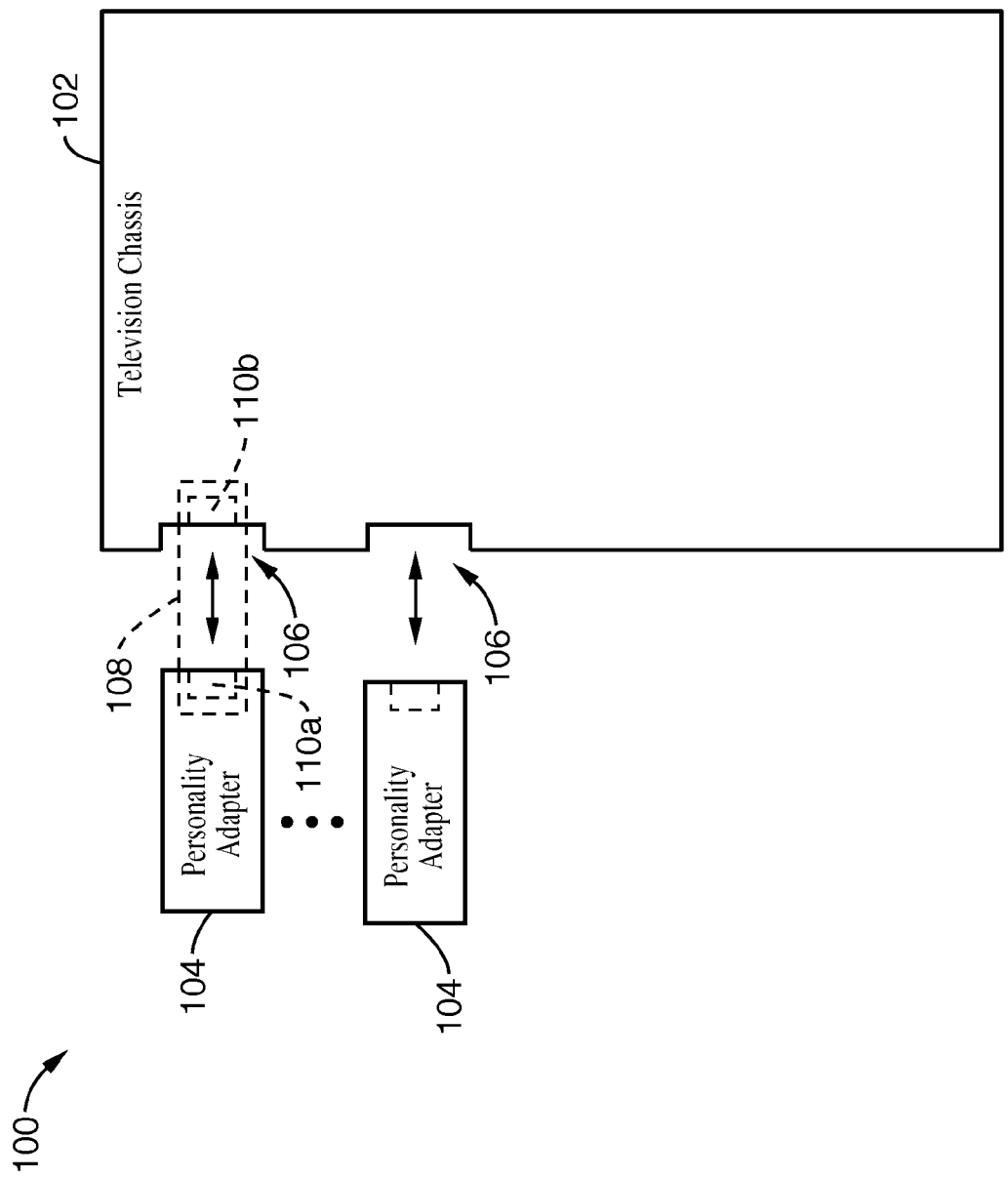
FIG. 3 is a system level diagram of an embodiment of a multimedia system according to the present invention in which one or more personality adapters are connected to a television for expanding the functionality of the television.
Figure 9:
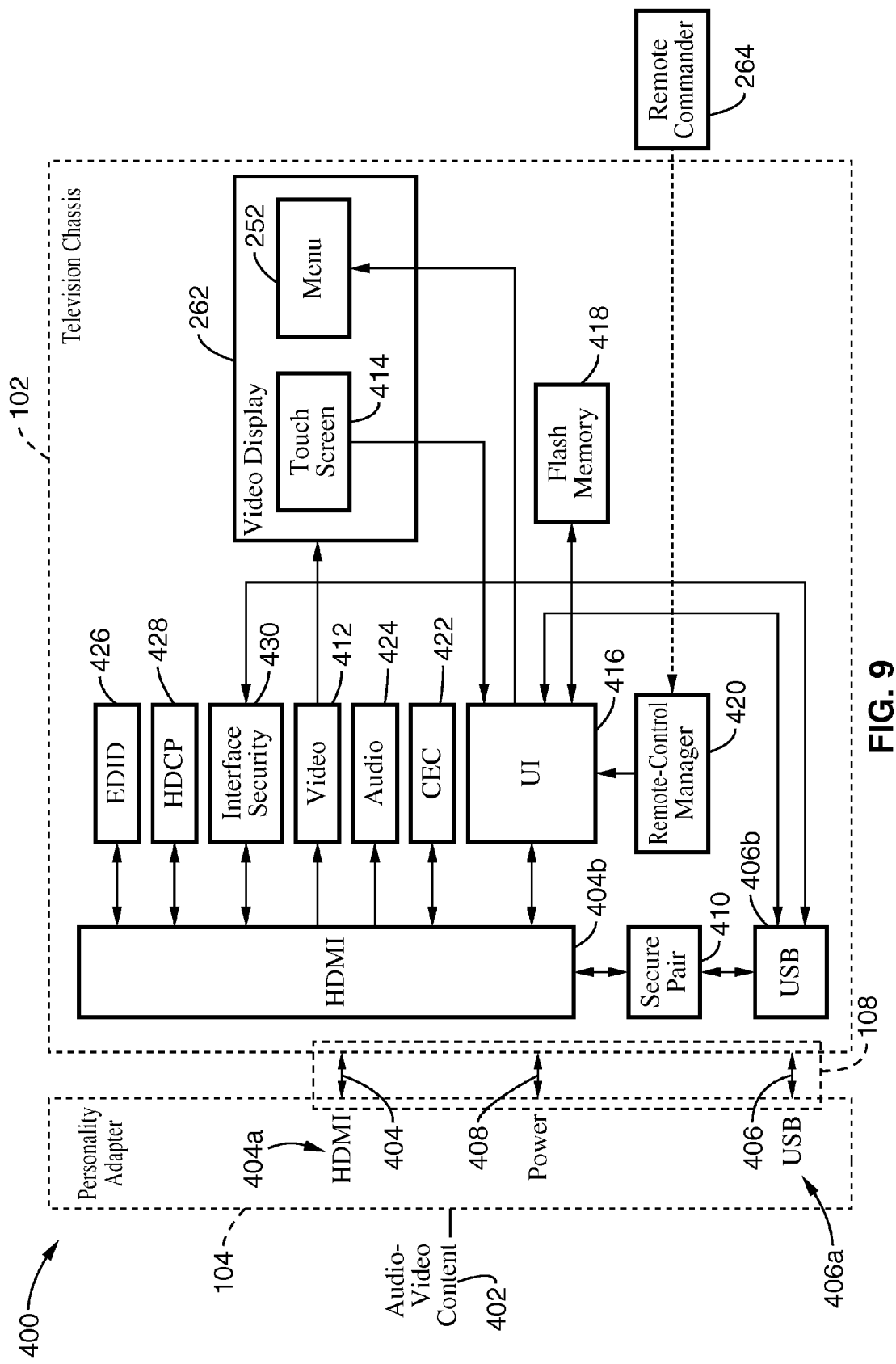

FIG. 9 is a functional block diagram of an embodiment of the multimedia system illustrated in FIG. 3.

Figure 10:
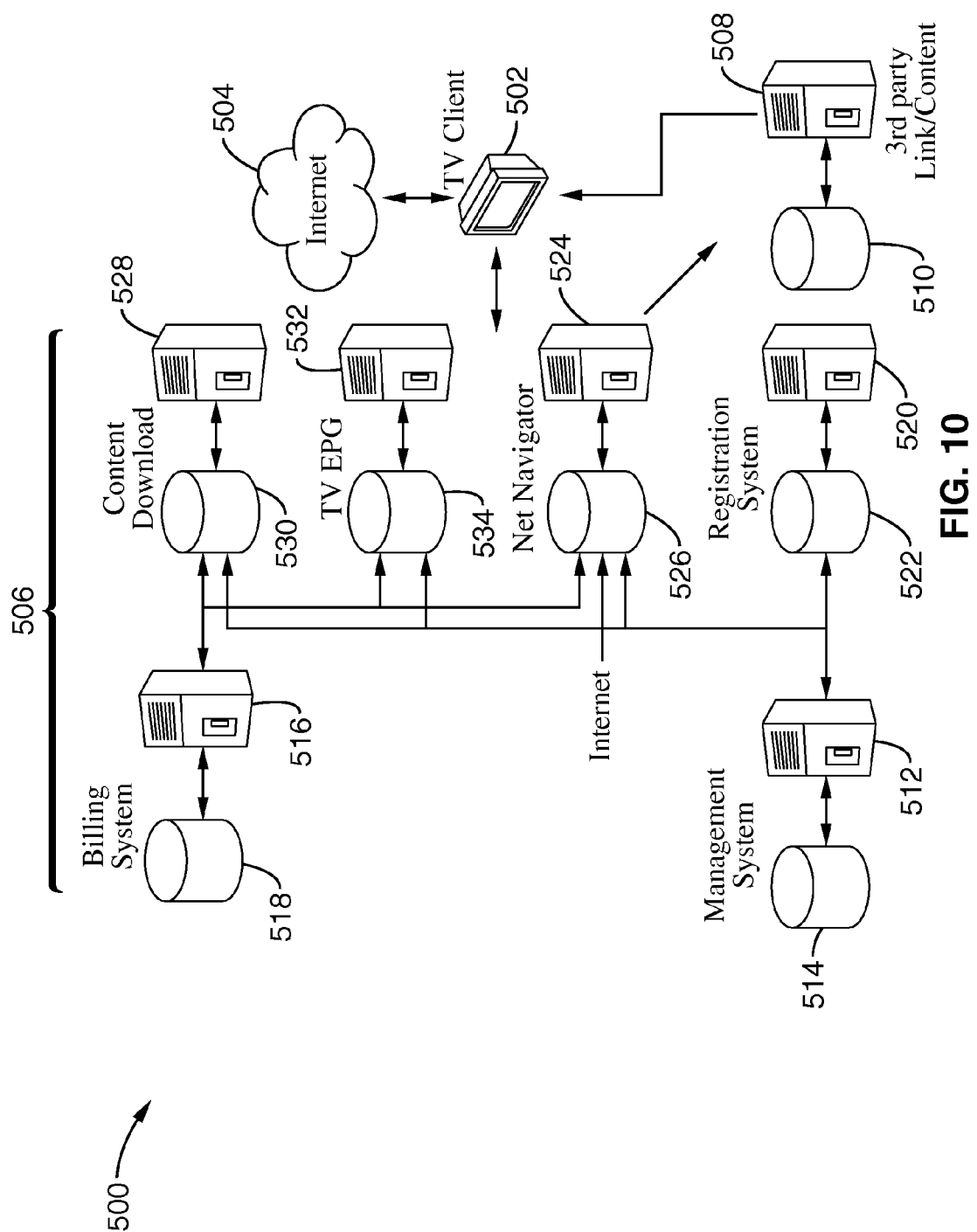

FIG. 10 is a functional block diagram of an audio-video system embodiment of the present invention that allows subscriptions to audio-video content searchable on and downloadable from the Internet.

Figure 11:
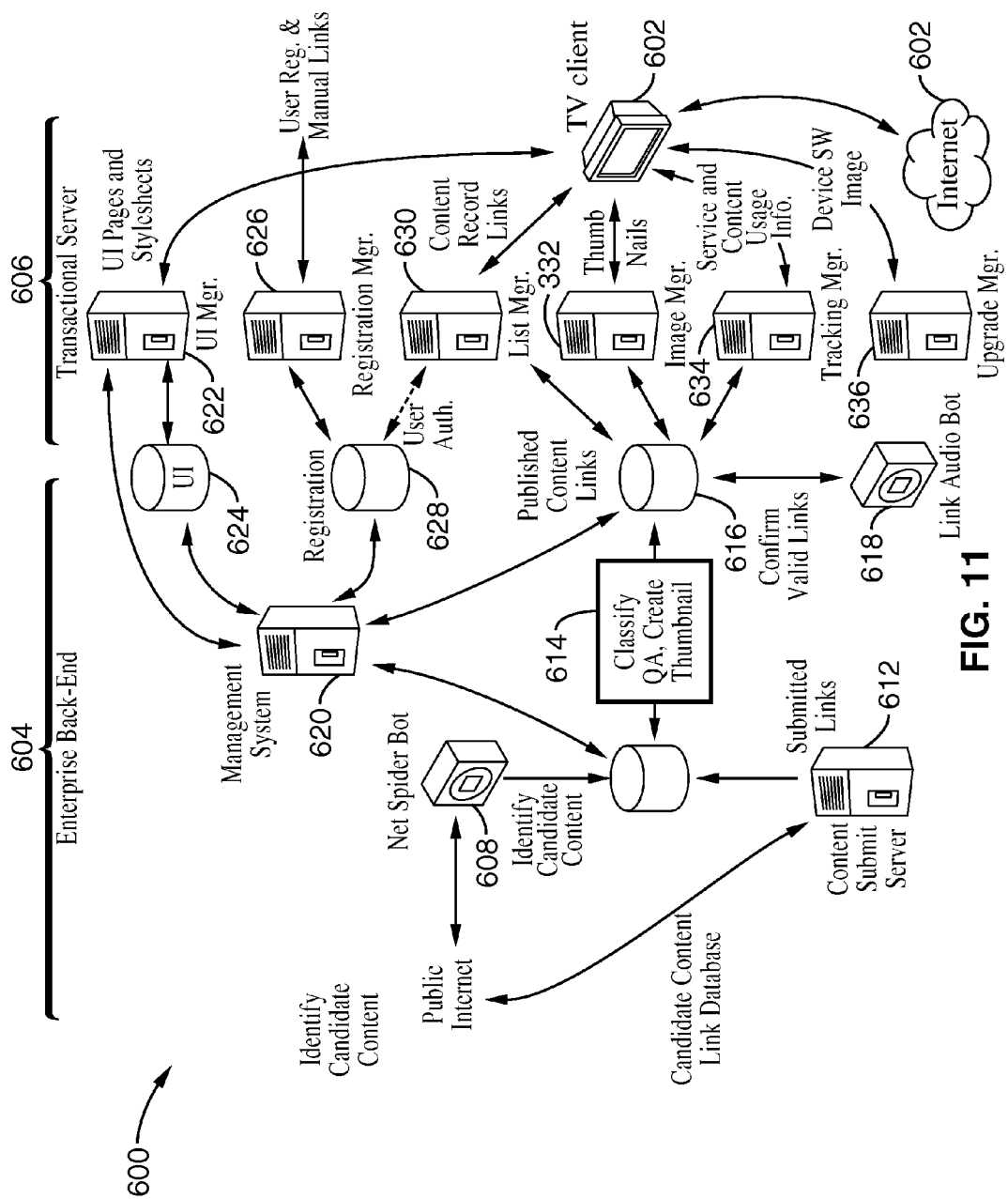

FIG. 11 is a functional block diagram of a transactional server and enterprise back-end in a system embodiment of the present invention that can crawl the Internet for audio-video content and publish content links, thumbnails, user interface (UI) pages and style sheets.

DETAILED DESCRIPTION OF THE INVENTION

System Overview

Referring first to FIG. 1 through FIG. 3, a generalized embodiment of an automatically reconfigurable multimedia system with interchangeable personality adapters according to the present invention is shown, and is referred to herein by the general reference number 100.

System 100 comprises a multimedia appliance 102, such as a television (TV), having a conventional set of inputs and operational features, and one or more personality adapters 104 that enhance the functionality of the TV 102. The personality adapters 104 are removable and interchangeable, and physically and electrically connect to the TV.

As illustrated in FIG. 1 and FIG. 3, one method of physically connecting the devices is for the TV 102 to include a docking port 106 in the form of a slot or receptacle into which the personality adapter 104 can be inserted and subsequently removed. As illustrated in FIG. 2, another approach would be to connect the personality adapter 104 to the back of the TV 102 in a set-back mounting configuration using screw-type VESA mounts or the like. Essentially any captive connector with a release mechanism, or any other physical connector mechanism that securely attaches the personality adapter 104 to the TV 102 could be used.

In one embodiment, multiple docking ports 106 are provided so that more than one personality adapter can be connected to the TV at the same time; however, only one such docking port would be needed in an embodiment where the personality adapters are interchangeable.

The system also includes an interface 108 between the TV and each personality adapter 104. In the card-type embodiment illustrated in FIG. 1 and FIG. 3, the interface 108 preferably includes mating connectors 110a, 110b for providing HDMI and USB communications between the personality adapter 104 and TV 102, as well as for providing power to the personality adapter. In one embodiment, power, HDMI and USB are provided over one or more proprietary/custom connectors. Use of proprietary connectors also provides a degree of security so that only authorized personality adapters 104 can function with the TV 102. In the set-back type embodiment illustrated in FIG. 2, standard HDMI and USB connectors and cables could be used. In either configuration, it will be appreciated that power for the personality adapter could be provided over the USB interface, but that a separate power connection may alternatively be provided for loads that exceed the capability of the USB connection. Furthermore, in some embodiments additional security can be provided through, for example, application programming interfaces (API). Additional security methods are described in more detail below.

Personality Adapters

Referring also to FIG. 4A through FIG. 4F, a variety of personality adapters can be used in the system of the present invention.

Figure 4A:
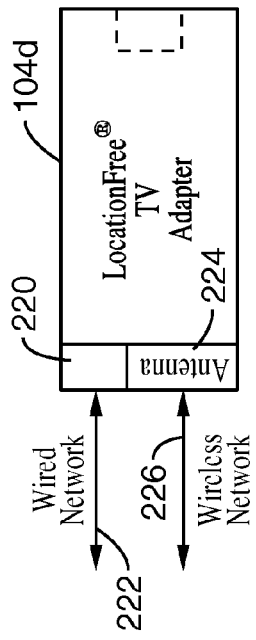
FIG. 4 illustrates examples of personality adapters for use with the multimedia system of the present invention.

For example, FIG. 4A illustrates a network adapter 104a for providing communications capability between TV 102 and a wired or wireless network, including access to the Internet. In one embodiment, the network adapter is a wired network adapter such as an Ethernet or USB adapter having a standard connection port 200 for providing access to a wired network 202. In another embodiment, the network adapter is a standard 802.11a/b/g/n wireless local area network (WLAN) adapter, WiFi adapter, or other wireless communications adapter having an antenna 204 for providing access to a wireless network 206. Conventional wired or wireless communications circuitry, protocols and functionality would be provided for network interconnection.

Figure 4B:
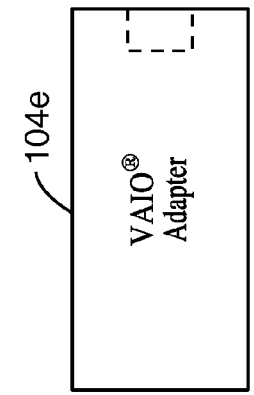

FIG. 4B illustrates a storage adapter 104b for providing mass storage for TV 102. For example, photographs and videos could be stored on storage adapter 104b for viewing on TV 102, or mass storage could be provided for use in connection with other personality adapters (e.g., for use with VAIO® adapter 104e described below). In one embodiment, the storage adapter includes a conventional small form factor hard disk drive 208 and/or conventional flash memory 210, and preferably a port 212 to receive a removable memory storage device 214 such as a conventional Memory Stick®, USB flash drive, compact flash card, or similar non-volatile memory.

Figure 4C:
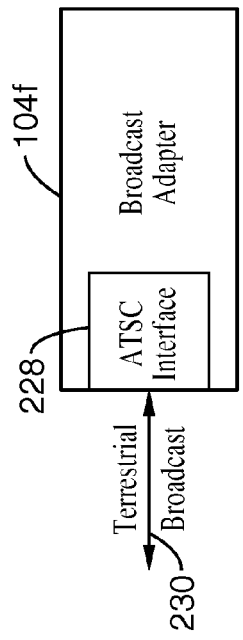

FIG. 4C illustrates a cable adapter 104*c* for receiving programming on TV 102 from a cable company 216. For example, cable adapter 104*c* would provide the functionality provided by a conventional set top box (STB). In one embodiment, the cable adapter 104*c* includes a conventional tuner 218 and a conventional decoder 220. In one embodiment, the external cable connection is made directly to the cable adapter 104*c*. In one embodiment, the tuner 218 and decoder 220 receive analog cable signals and convert the signals into composite video signals, also called CVBS (composite video blanking and sync) and multi-channel television sound signals, better known as MTS and often referred to as BTSC (named after the Broadcast Television Systems Committee which created it), to a video and NTSC-format audio decoder in the TV 102. In one embodiment, the tuner 218 and decoder 220 are digital cable ready (DCR) and/or interactive digital cable ready (IDCR), thereby providing CableCARD-like functionality, for converting the digital signals into a form for processing by an MPEG-2 AVC/VC-1 decoder or the like in the TV 102. In one embodiment, the decoding functionality normally found in the TV 102 is included in the cable adapter 104*c* itself, so that the TV 102 need only provide basic image and audio processing such as driving an LCD display and audio amplifier.

Figure 4D:
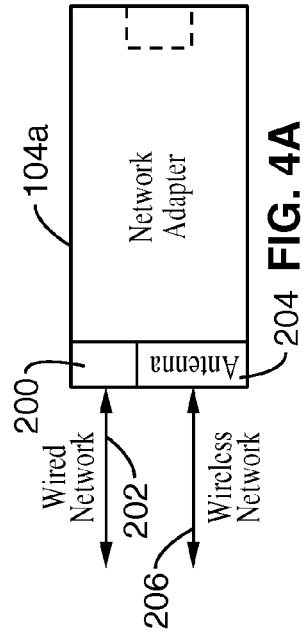

FIG. 4D illustrates a SONY Location Free® TV adapter 104*d* for streaming audio and video from TV 102 to other devices. This adapter includes a standard Ethernet or USB network adapter having a connection port 220 that connects to a wired network 222 connected to the Internet for sending streaming audio and video signals from TV 102 to remote personal computer or other device connected to the Internet. In addition, this adapter includes a standard 802.11a/b/g/n wireless local area network (WLAN) adapter, WiFi adapter, or other wireless communications adapter having an antenna 224 that transmits streaming audio and video signals from TV 102, over a wireless network 226, and to a personal computer (notebook or desktop), a SONY PSP® or other compatible client device such as a Windows Mobile pocket PC or Mac. Conventional wired or wireless communications circuitry, protocols and functionality would be provided for network connection. In one embodiment, the LocationFree® adapter streams audio and video from the TV 102. In another embodiment, the LocationFree® adapter steams audio and video from external devices such as a DVD player, a camcorder, another personality adapter, or other device which is connected to TV 102 and which has an audio and/or video output to TV 102.

Figure 4E:
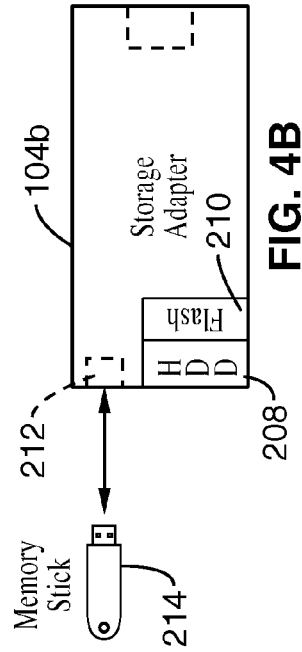

FIG. 4E illustrates a VAIO® adapter 104*e* which comprises a repackaged SONY VAIO® computer without a display. This adapter turns TV 102 into a fully functional personal computer.

Figure 4F:
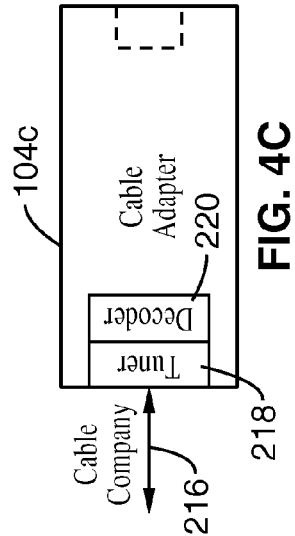

FIG. 4F illustrates a broadcast adapter 104*f* for receiving terrestrial broadcasts on TV 102. For example, broadcast adapter 104*f* includes an ATSC interface 228 for receiving over the air (OTA) or terrestrial broadcast signals 230. This adapter adds a broadcast tuner/decoder to TV 102 and allows the user to watch two programs simultaneously, to watch one program while recording another, and other flexibility provided by essentially having two or more television receivers in one unit.

The foregoing are merely examples of personality adapters and features that can be provided by personality adapters according to the present invention. Additional types of personality adapters and features include, but are not limited to, essentially any audio-video device such as Blu-ray Disc™ devices, DVD devices, PVR devices, DVR devices, VHS devices, IP-TV devices, video game devices, set-top box devices (e.g., satellite, cable), and digital or analog music devices, and so forth. It will be appreciated that the range of features which can be provided by personality adapters are unlimited, and that the interchangeability of personality adapters provides for a high degree of functional flexibility.

Personality Adapter Storage Expansion

As previously described, personality adapters 104 are slidably engageable with corresponding receptacles in TV 102, or they are dockable to TV 102, or they are otherwise connectable to TV 102. One of the personality adapters previously described was a storage adapter 104*b* having an internal hard disk drive 208, flash memory 210 and a port 212 for receiving a Memory Stick® 214 or other form of removable memory. When the storage adapter 104*b* is inserted into the TV 102, the TV 102 displays a menu or list of stored content that is available to the user.

In various other embodiments of the storage adapter 104*b*, there need not be any internal mass storage device. Instead, storage adapter 104*b* can simply include one or more ports for connection to external storage devices. Such ports could include, but are not limited to, one or more computer network connection ports such as universal serial bus (USB) ports and/or Ethernet ports, as well as solid state memory element interfaces such as slots for receiving solid state memory cards. The particular mix and configuration of the ports/slots of a storage adapter would be determined in the discretion of the manufacturer of the personality adapter or the manufacturer of the TV 102, or both.

In one embodiment, the storage adapter 104*b* functions as an interface between external storage devices and the TV 102. In this embodiment, the storage adapter 104*b* is configured with one or more conventional receptacles that can, in turn, removably receive (e.g., by sliding) a respective storage device. In another embodiment, the storage adapter 104*b* functions as an interface between the TV 102 and external storage devices that have non-standard connectors. In a non-limiting example, the physical part of the interface can include a "non-standard" connector in the storage adapter 104*b* and a complementarily-configured connector on the storage device. By non-standard, it is meant that the connectors are proprietary to the manufacturer of the TV 102 in that standard connectors that can be used with devices of other manufacturers cannot be used as the connectors. In the foregoing non-limiting embodiment, each connector may include a top row of connector elements such as pads or pins or sockets with the first three elements in the row being smaller than the last element in the row. A similar bottom row of connector elements can be provided and can be separated from the top row by a spacer section.

In one embodiment, the storage adapter may also include a microprocessor and function as a primary storage adapter. In the foregoing non-limiting embodiment, the primary storage adapter can be configured to receive a secondary personality adapter, such as a secondary storage adapter having an internal hard drive or other mass storage. The interface between the primary storage adapter and secondary storage adapter can then also include an application programming interface (API) executable by the processor of the primary storage adapter.

In one embodiment, the interface between the primary and secondary storage adapters could be a secondary interface that is different than, and in some embodiments more relaxed than, interface 108 so that the TV 102 can display a list of content on the secondary storage adapter without requiring the menu to be further populated or without requiring individual graphical user interfaces (GUI).

In some embodiments, the storage adapter 104b includes a microprocessor and an application programming interface (API) executable by the microprocessor. The API allows an Ethernet connection to the storage adapter to be viewed on the TV 102 only as a digital living network association (DLNA) connection such that only DLNA volumes and content associated with the storage adapter can be displayed on the TV 102. Also, in one embodiment, a USB device connected to the TV 102 by means of a USB plug on the storage adapter would be viewable by the system only as a storage medium. Thus, a computer connected to the USB plug of the storage adapter would be restricted by the API to functioning only as a storage medium and cannot function for other computing purposes.

Function Expandability

It will be appreciated that personality adapters according to the present invention could replace the normal functionality found in a TV 102, so that TV 102 would either not function or have very limited functionality without a personality adapter docked in TV 102. However, in the preferred embodiment of the invention, TV 102 is a fully functional TV by itself and does not require a personality adapter to function.

Figure 5:
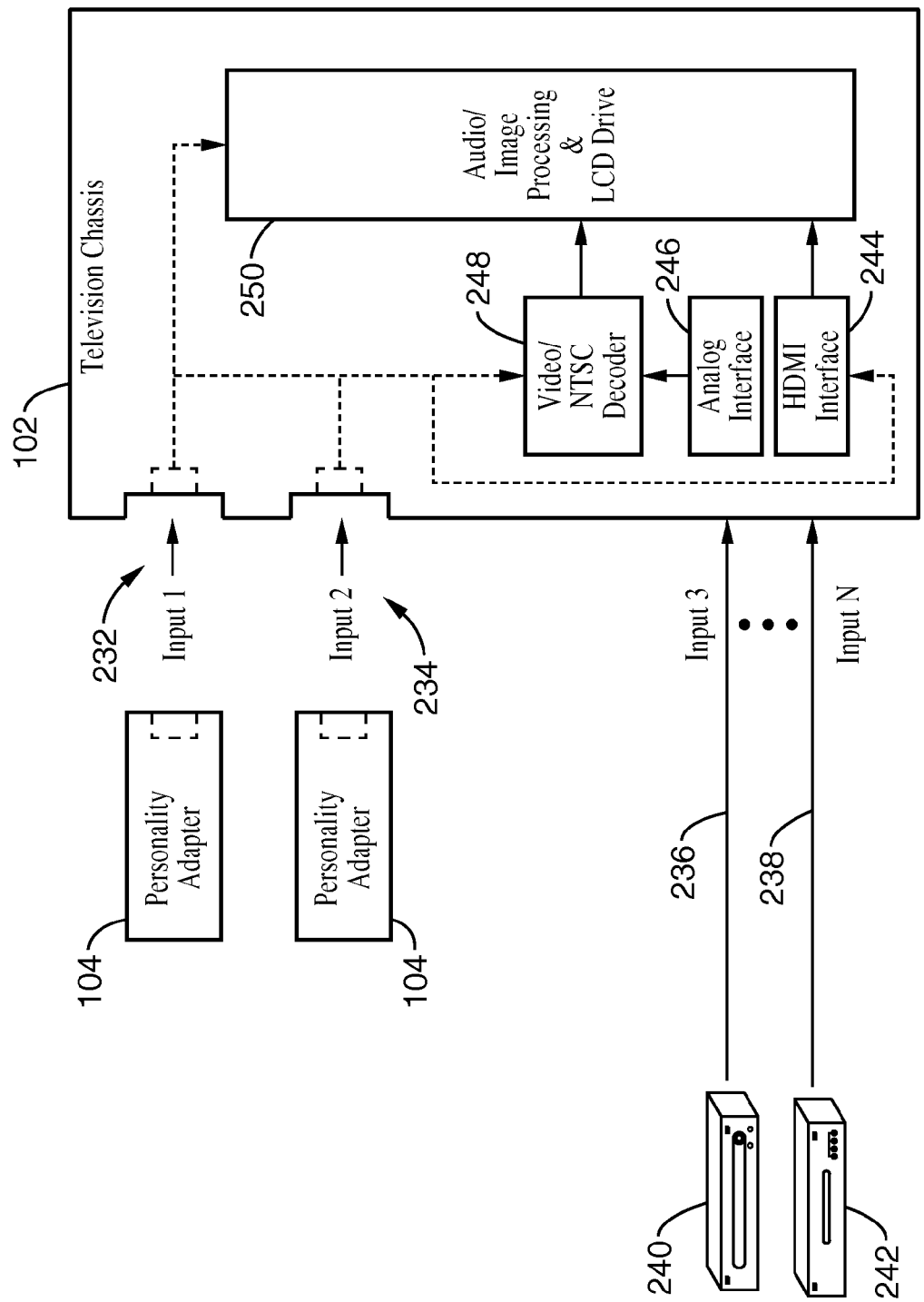
FIG. 5 is an expanded functional block diagram of the multimedia system illustrated in FIG. 3, showing connections to external multimedia source devices according to an embodiment of the invention.

FIG. 5 illustrates that the normal functionality of TV 102 is retained, including the ability to receive audio and video content input from devices other than the personality adapters. For example, as illustrated in FIG. 5, TV 102 includes multiple inputs 232 through 238. Inputs 232, 234 correspond to those associated with personality adapters 104, and inputs 236, 238 correspond to those associated with analog 240 and digital 242 source devices such as a satellite set top box, cable set top box, Internet protocol TV (IPTV) set top box, Blu-ray Disc® player, DVD player, VHS player, DVR, Playstation®3, etc. TV 102 still includes, for example, an HDMI interface 244, analog interface 246, video/NTSC decoder 248, audio/image processing and display driver circuitry 250, other circuitry and components as would normally be found in a TV to accommodate inputs from such devices.

As can be seen, therefore, the normal functionality of TV 102 is expanded by the personality adapters. Furthermore, the personality adapters do not operate as standalone devices, but essentially integrate into TV 102 to transform TV 102 into a different device. For example, in one embodiment, the TV 102 automatically reconfigures itself when a personality adapter is connected and provides the user with menus and remote control functionality that corresponds to the features provided by the personality adapter.

Dynamic TV Menu Expansion

Referring to FIG. 6, modern televisions include graphical user interfaces (GUI) to facilitate user operation, and electronic program guides (EPG) are a common form of GUI that provides for program and/or device selection through the use of a menu system 252. In one embodiment of the present invention, the personality adapters 104 store configuration (user interface) templates 254 containing information concerning the functionality of the personality adapter which are downloaded to the TV 102 when docked. A configuration rendering engine 256 in TV 102 processes the templates and the menu system 252 in TV 102 is then populated with the information from the personality adapter and automatically reconfigures itself. This reconfiguration can include, but is not limited to, adding icons, text, or other information 258 associated with the personality adapter to the existing menu information 260 that is presented on the TV display 262. In addition, in one embodiment the remote control functionality of TV 102 is also expanded so that the same remote commander 264 used with TV 102 can be used to access the functionality of the personality adapter through the TV 102.

As described above with reference to FIG. 4, personality adapters 104 can be variously configured to provide new or expanded functionality to the TV 102. Also, as described above with reference to FIG. 6, at least one embodiment of a personality adapter 104 includes a configuration template 254 that is stored in memory in the personality adapter and which is used to automatically reconfigure the menu 252 in TV 102 for the convenience of the user. In at least one embodiment, the configuration template is processed by a configuration rendering engine 256 in the TV 102. The configuration template can be pushed to the TV 102 by the personality adapter 104 over the USB channel, or alternatively the configuration template can be pulled by TV 102. In at least one embodiment, the configuration template is automatically transferred to the TV 102 when the personality adapter 104 is initially connected, and the menu is automatically reconfigured to provide access to functionality extended by the personality adapter. In other words, the menu in TV 102 is dynamically updated when a peripheral personality adapter 104 is connected, so that the TV menu displays menu items associated with the personality adapter.

In one embodiment, the TV 102 can query the personality adapter 104 for configuration information using, e.g., a hypertext transfer protocol (HTTP) "get" request. It is to be understood that alternatively, the personality adapter 104 can automatically push configuration information to the TV 102 without being requested to do so by the TV 102.

In one embodiment, the personality adapter 104 sends the requested configuration information to the TV 102 in, e.g., XML format, which is parsed by the TV 102 to extract the configuration information. In some implementations, the configuration information may include an application label, an application identification, an application icon location to be used in placing the icon on the TV menu, and an application order for ordering the applications on the TV menu. The term "application" is used generally herein, and is meant to include the personality adapter itself, or functions or features provided by the personality adapter. As set forth further below, the application label can have the name of the application in different languages so that the TV 102 can display the application name in the user's choice language.

Using the parsed information, the TV 102 reconstructs the TV menu by, e.g., updating an internal category table that is used as the menu representation. The TV 102 can retrieve (alternatively, can be automatically provided) translation files from the personality adapter 104 so that the application label may be presented on the TV in the language chosen by the viewer.

Files representing the icon(s) of the application(s) to be added to the menu may be retrieved (alternatively, can be automatically provided) from the personality adapter in embodiments wherein the menu presents not just an application label in alpha-numeric format but an icon as well for each application. The icon data is retrieved from the location that is specified in the application information, since the TV 102 does not know the context of the newly added application.

With the application information now fully in hand, the TV 102 displays the newly added application labels and icons on the menu along with the previous icons and labels.

It will be appreciated that the linkage between a TV menu item and an added application is the application identification, with all the menu items being described by the above-mentioned application information. When the user selects an icon on the menu, the TV 102 sends the application ID to the application host (e.g., the personality adapter 104). The application ID is unique so that the correct application that the user selected can be invoked.

It will further be appreciated that the application information on the TV menu can be updated dynamically, so that when the application items that are available change, the application information is simply sent to the TV 102, which reconstructs the menu on the fly. Furthermore, because the application information can be in XML format, the application information can be used not only to update the TV menu, but also to update any other devices such as game consoles that can use the application information.

The actual behavior of each menu item can be implemented either in the configuration template 254 or in the TV 102. If desired, applications can be periodically polled by the TV 102 to ensure they are still available and if an application does not respond, its icon and label can be removed from the TV menu.

Referring again to FIG. 6, the implementation shown in that figure is colloquially referred to as a "cross media bar" or "XMB". As shown, plural icons 258, 260 are presented in an ordered list, which can include associated alpha-numeric application labels presented next to, above, or below at least some of the icons. The icons may be category icons, indicating, e.g., "video", "music", "computer", "Internet", "LocationFree®", etc., and sub-icons representing applications within a category can be displayed as well. Other icon arrangements and layouts can be used.

Content-Based Switching

Referring to FIG. 5 and FIG. 6 together, it will be appreciated that menu system 252 provides a GUI that allows the user to access content or functionality that is built into TV 102, that is provided by a personality adapter 104, and/or that is provided by an external device 240 connected to TV 102. Input 232 (Input 1) through input 238 (Input N) in FIG. 5 and FIG. 6 represent various sources of such content and functionality. In one embodiment of the invention, menu system 252 provides content-based input switching. More particularly, when the user selects particular content or functionality through the menu system 252, the TV 102 automatically accesses the particular input where such content or functionality is provided. This is facilitated, for example, by TV 102 being able to know the type of device or input source is connected to a particular input. For example, HDMI allows for device information to be communicated to TV 102 for content-based input switching. Where such information is not communicated over the HDMI channel, the menu system 252 would be programmed to associate a particular source device with a particular input.

Security Overview

Referring to FIG. 7, in one embodiment the system also includes software, firmware or other means for ensuring that the HDMI and USB connections are on the same TV. The personality adapter reads 300 a unique TV identification number over the HDMI channel and sends 302 the identification number back to the TV over the USB channel for authentication 304. At 306, if the authentication fails, then the TV refuses to allow the personality adapter to operate with the TV; otherwise, operation of the personality adapter is permitted. In addition, in one embodiment, this allows for identification of which HDMI port on the TV is being used with a particular type of personality adapter to facilitate the content-based input switching described above.

In addition, referring to FIG. 8, in one embodiment the system provides for security between the personality adapters and the TV 102 over interface 108. In one embodiment, each personality adapter includes one or more copyrighted security files that are transferred to the TV over interface 108 when the personality adapter is docked. At 350, the TV reads the security file and verifies the presence of the file and authenticity of the file or an attribute (e.g., copyrighted data, watermark, etc) associated therewith at 352. At 354, in absence of the proper data being transferred from the personality adapter or the data being recognized by the TV as being authentic, the TV refuses to allow the personality adapter to operate with the TV; otherwise, operation is permitted. Accordingly, counterfeit personality adapters are not allowed to be used with the TV 102.

Interface and Operation

An audio-video system embodiment 400 of the present invention is illustrated in FIG. 9, and also provides additional details of personality adapters 104. System 400 comprises a TV 102 with at least one personality adapter 104 docked to the TV and which can access audio-video content 402 such as webpages, video streams, music, digital photographs, video games, etc. A digital interface 108, which includes a high definition multimedia interface (HDMI) 404 and a serial bus interface such as a universal serial bus (USB) 406, are included to support a secure transfer of audio-video-content data and control. A power connection 408 is also provided for powering the personality adapter 104.

A secure-pair device 410 will verify to the personality adapter 104 that its HDMI and USB connections are indeed connected to a single device, in this case, television set 102. It can do this by sending an encrypted challenge out on the HDMI 404, having the TV 102 compute its encrypted answer, and then placing that answer on USB 406 to be verified. USB 406 further provides a form of high-bandwidth back-channel communication that can talk while the HDMI 404 is carrying the audio-video content. Such serial interface is capable of much higher communication rates than are ordinarily possible in the HDMI's reverse channel.

The video display 262 is driven by a video processor 412 that has been supplied with the audio-video content 402. A soft menu system 252 and a touch screen 414 are each connected to a user interface (UI) 416, and the menu and touch screen may overlap to provide soft-keys. The touch screen 414 is not strictly necessary, but is an alternative to function access solely through remote commander 264 or other means.

Configuration UI templates associated with particular audio-video content 402 and/or functionality of personality adapter 104 are received from the personality adapter 104 and rendered to populate menu 252 and to configure how touch screen 414 or the wireless remote commander 264 interpret user inputs. Such UI templates can also produce a trade-dress kind of look and feel on video display 262 that can reassure the user that they have accessed a familiar provider or found the right service or product.

UI templates and other configuration data are preferably stored in the personality adapter 104 and are automatically transferred to TV 102 when docked for automatic reconfiguration of TV 102. User settings and other configuration preference data in particular, are preferably stored in flash memory 418, and uploaded to personality adapter 104 when it is docked so that the user does not have to repeat their preferences every time a new personality adapter 104 is introduced or selected. The personality adapters 104 automatically download the necessary UI templates unique to their use to UI 416. Any required modifications to the main menu 252 will also get updated automatically to suit the application function supported by each active personality adapter 104.

An Internet media guide, like a TV electronic programming guide (EPG), can be implemented with a UI template, and these are filled with navigation image thumbnails arranged in a mosaic. The Sony PSP handheld game system is an example of one device that has an easy to use menu that provides access to a large number of choices. The Microsoft Vista Media Center is another example of a modern user interface with thumbnails that be leveraged here. Corresponding audio-video content will be launched when the user selects any one thumbnail. A matrix portion of the video display 262 can be vertically scrolled to present an unlimited number of pages.

The wireless remote commander 264 sends user commands for processing to a remote-controller manager 420 over an infrared beam or the like. Such commands are interpreted by which soft-keys and buttons the user may have navigated to on the video display 262, or by electronic program guides (EPG) and soft-keys provided by near field communication (NFC) to be displayed on a display on the remote commander 264 itself. Other keys provided on the wireless remote commander 264 may be hardwired and function independent of the action on the video display 262. The wireless remote commander 264 and touch screen 414 are two basic ways a user can navigation through all the possibilities to be browsed in audio-video content 402.

A digital video interface (DVI) could be used instead of HDMI 404, but HDMI is preferred because it supports many useful protocols and multi-channel audio as well. A tuner may be included in television set 102 for over-the-air (OTA) broadcast reception, or tuning through ordinary community cable TV (CCTV) service without a cable TV tuner. Alternatively, a cable TV tuner could be included as a personality adapter 104, or integrated within the TV 102 itself.

An HDMI interface naturally includes a consumer electronic control (CEC) interface 422. The CEC provides a back channel that can be used for global device discovery and control, e.g., single remote control of all devices on the CEC bus. CEC assumes that all the AV sources in a system are directly or indirectly connected to a root. The various HDMI connections virtually form an upside-down tree, with the video display as the root, the switches as branches, and the various sources as leaf nodes. Unfortunately, CEC is a low speed communications channel, so TV 102 is equipped with the USB interface 406 to enable higher data rate reverse channel communication with devices also attached to HDMI 404.

The TV 102 will function as a conventional video monitor and can be connected to display video and audio from cable tuners, DVD players, digital video recorders, personal computers, and other consumer electronics devices. The user simply plugs an HDMI cable connector into HDMI 404, and such is the usual way a typical consumer would expect to use TV 102. Several such HDMI interfaces 404 can be provided on a single TV 102, e.g., to eliminate having to swap connections around for different uses and applications.

An audio sub-system 424 provides Dolby 5.1-channel and/or other sound output capabilities.

An extended display identification (EDID) circuit 426 is included in TV 102 to uniquely identify the TV 102 to an inquiry presented on the HDMI 404. EDID is a standard defined and published by the Video Electronics Standards Association (VESA). EDID's include codes for each manufacturer's name, product type, phosphor, filter type, timings supported by the display, display size, luminance data, pixel mapping data, etc. Such EDID 426 will identify TV 102 through its make and model codes as being capable of working with a range of special application extension modules, as having high-bandwidth digital content protection (HDCP) capability, etc. For example, the personality adapters will be able to identify through their interfaces that TV 102 is compatible and authorized.

A high-bandwidth digital content protection (HDCP) circuit 428 responds to a secure protocol defined in a standard published by Intel Corporation. A proper HDCP response will unlock high definition (HD) video sources so that they will provide their highest resolution video to the HDMI 404. HDCP engagement means that data transfers over the HDMI 404 will be encrypted to prevent interception by eavesdroppers. HDCP is a form of Digital Rights Management (DRM) developed by Intel Corporation to control digital audio and video content as it travels across DVI or HDMI connections. The specification is proprietary, and creating an implementation of HDCP requires a license. HDCP is licensed by Digital Content Protection, a subsidiary of Intel. Licensees agree to limit the capabilities of their products when requested by the source, e.g., high-definition digital video content must be restricted to DVD quality on non-HDCP compliant video outputs. DVD-audio content is restricted to DAT quality on non-HDCP digital audio outputs. Licensees must design their products to not allow their devices to make copies of content, and the design must effectively frustrate attempts to defeat content protection.

HDCP operates to prevent interception or play of non-encrypted high definition content by unlicensed display devices. An authentication process disallows non-licensed devices from receiving HD content. Encryption of the actual data sent over DVI or HDMI interface prevents eavesdropping of information, and prevents "man in the middle" attacks. Key revocation procedures ensure that devices manufactured by any vendors who violate the license agreement can be blocked from receiving HD data. Updated lists of valid keys are circulated in background via various publication mediums, e.g., DVD's with licensed content.

Each HDCP capable device has a unique set of keys, there are forty keys, each 56-bits long. These keys are confidential and failure to keep them secret may be seen as a violation of the license agreement. For each set of keys, a key selection vector (KSV) is created. For example, each KSV has 20-bits set to zero, and the other 20-bits set to one.

During the authentication process, both parties exchange their KSV's. Then each device adds, without overflow, its own secret keys together according to a KSV received from another device. If a particular bit in the vector is set to one, then the corresponding secret key is used in the addition, otherwise it is ignored. Keys and KSV's are generated in such a way that both devices will compute the same 56-bit number as a result. That number is later used in the encryption process.

Encryption is performed by a stream cipher. Each decoded pixel is encrypted by applying an XOR operation with a 24-bit number produced by a generator. The HDCP standard provides for repeated key updating, e.g., after each encoded frame. If a particular manufacturer's model is considered compromised, its associated KSV is added into a revocation list that is duplicated by cooperating publishers on their disks produced with HD content. Each revocation list is signed with a digital signature using the DSA algorithm, to prevent malicious users from revoking legitimate devices. During the authentication process, if the receiver's KSV matches one in a revocation list the source has on hand, the source blacklists the receiver as compromised and will refuse to send HD data to it.

Alternative ways to provide interface security are represented by interface security module 430. Such would be used, for example, when a single manufacturer wanted to restrict interconnections between devices to only those within its family of proprietary products, and not simply to anyone's HDCP device. A TV set manufacturer may also want to secure the link between the remote commander 264 and remote control manager 420, in which case interface security module 430 could provide the necessary encryption and validation. Rolling codes, as are commonly used in digital garage door openers could also be used to secure the remote control link.

Embodiments of the present invention could well employ both HDCP 428 and interface security module 430.

The HDMI-USB pairing security module 410 can receive an encrypted challenge on HDMI 404 and respond with an encrypted answer on USB 406. Such challenge can be derived from a random number generated, or an HDCP key. This could be important when a content source attached to both HDMI 404 and USB 406 needs to verify that the two interfaces are paired together on a single display device, such as TV 102. For example, spoofing with a PC connected to the sources' USB connector can be prevented because the PC will not receive the challenge on the HDMI and cannot generate the correct encrypted answer.

The user interface (UI) controller 416 is able to receive UI templates that provide function and look-and-feel particulars to the on-screen menu 252 and remote control manager 420. Such allow the remote commander 264 to be re-personalized for each application to which TV 102 may then be assigned. The on-screen menu 252 and associated touch-screen 414 are then re-configured to change and fit particular applications.

Near field communication (NFC) is preferably used to allow the remote commander 264 to download an appropriate electronic program guide (EPG) from TV 102. An infrared (IR) wireless channel is used in a conventional way to transmit user commands from the remote commander 264 to the TV 102. The large data volume associated with EPG is triaged by sending over the essential channel information first, and then sending the details of each program as secondary data. Program information for showings more than three hours out are transferred as tertiary data, e.g., later as time permits. That way, the relatively slow-speed NFC medium can be used to satisfy the most immediate and most probable information needs of the user.

Remote control manager 420 may be configured to receive only IR commands that have been encrypted or otherwise convoluted so as to recognize only remote commander 264. The object of this is to prevent the substitution of a universal type remote commander that could not support the full user interface and capabilities of remote commander 264.

The personality adapter 104 may alternatively be implemented as an application extension device in a set-back box (SBB) type configuration. The SBB can query TV 102 through the HDMI 404 and access EDID 426 to see if the TV 102 is capable of operating with this particular SBB.

Personality adapters 104 interface to the television set 102 and provide it with a way to search for audio-video source content, and to access any audio-video source content selected. For example, with an Internet personality adapter 104, an Internet service can enable registered/paid subscribers to browse content lists and thumbnails. These are used to populate a user interface rendered on video display 262. The user selects which one to access using the touch screen 414 and/or remote commander 264. Such selection results in a uniform resource indicator and user interface templates needed for the user to interact with the provider and the audio-video content 402.

The extended display identification data structure provided by EDID 426 is the type usually provided by a computer display to describe its capabilities to a graphics card. This is what enables a modern personal computer to know what kind of monitor is connected. EDID is defined by a standard published by the Video Electronics Standards Association (VESA). The EDID includes manufacturer name, product type, phosphor or filter type, timings supported by the display, display size, luminance data and pixel mapping data. EDID structure 2.0 defines a new 256-byte structure. The channel for transmitting the EDID from the display to the graphics card is usually the $I^2C$ bus. The combination of EDID and $I^2C$ is called the Display Data Channel version 2, or DDC2. The "2" distinguishes it from VESA's original DDC, which used a different serial format.

Accessing Online Audio-Video Content

FIG. 10 shows an on-line audio-video content system 500 that can be accessed by TV 102 with an appropriate personality adapter 104. These are represented in FIG. 10 as TV client 502. The Internet 504 is accessible, and on the Internet will be found a subscription TV-client services network 506. URI links are obtained by TV client 502, and then used to go onto the Internet 504 to get the content directly. For example, a third party provider 508 has its own content database 510 that is referenced by URI values obtained through the TV-client services network 506.

The TV-client services network 506 includes a management system 512 with a management database 514, a billing system 516 with a billing database 518 to invoice subscribers and accept payments, a registration system 520 and registration database 522 to manage subscriber registrations and log-ins, a net navigator 524 and navigation database 526, a content system 528, and a content download database 530, and a TV electronic program guide (EPG) system 532 and an EPG database 534.

Once a specific service has been selected by the user, the television set 102 transitions control of the video display 262 to the client personality adapter 104 and indicates to the platform the selected service. The service platform keeps a current list of the authorized data service providers, e.g., individual records with the URI data for each featured service. The server is always the root source for UI templates and design, albeit the actual HTML, CSS, and JavaScript data may be cached on the client to improve local performance. Any partner service selected by a user from the TV menu 252 will provide a dynamic content portion displayed within a corresponding UI template. The URI data record for each particular service includes a field for a CSS script associated with the service, in order to support modification of the UI displayed template; e.g., overlaying the logo of the user-selected service provider. The scripts associated with the UI provided by the server execute the same for all service providers. There is a syntax for the requests, and an expected response syntax.

The server is aware of the requirements and limitations of UI 416 with respect to the size and quantity of images that can be displayed at one time. It would also understand the relationship between a particular image and the associated heading. The server is required to format the lists returned to the requestor for presentation by UI 416.

Essentially, TV-client services network 506 is an array of databases, server and network elements that implement the finding and delivery of URI links and associated metadata for audio-video content available on the Internet.

A gatekeeper model permits one organization to concierge, control and profit from all the content accessed by TV client 502. The actual content need not be hosted, only pointers to it in the form of URI's. Such responses to clients an XML list and description of the services provided. A really simple syndication (RSS) link server provides an XML list of RSS services to the TV client 502. Such links can be tested and certified as to their quality. Content creators are charged a fee for having their links and referrals featured. Music and video streams are managed by a specialized server. The network locations of the concierge are hardwired in, so that the user interfaces are simplified. The concierge is then able to engage in load-balancing of a large support infrastructure needed to service a large population of TV clients 502 twenty-four hours a day, seven days a week.

The data flow for a net navigator 600 is presented in FIG. 11. A TV client 602, such as previously described, is interfaced through the Internet to an enterprise back-end 604 behind a transactional server 606. The transactional server 606 can be implemented as a Linux-Apache-Php platform. A net spider bot 608 searches for and identifies URI data for audio-video content publicly available on the Internet. The raw information is stored in a candidate content link database 610. Content can be submitted voluntarily to a content submit server 612 and the contributed information is added to the candidate content link database 610. TV client 602 is able to exchange service and content usage information with tracking manager 634. The URI information is formatted into records that include metadata and thumbnail posters created from the content. Each record is sorted using multiple sort keys, and their indices are also stored by a process 614 in a link record database 616. A link audit bot 618 confirms the links collected are valid and continue to be valid. A management system 620 controls this and other processes, e.g., UI templates, registration, lists, images, tracking, and upgrading. A webserver, UI manager 622 and database 624, supply the UI templates that fit particular content being browsed or downloaded by the TV client 602. UI content is service specific. The UI manager 622 delivers scripts that are rendered by the TV client 602 into user interfaces which allow the image manager 632 to populate the UI menus with thumbnails of the audio-video content available.

A registration manager 626 and database 628 are used to control system access to authorized users, e.g., TV client equipment purchasers or paid subscribers. A list manager 630 provides lists of content computed from the link record database 616. Thumbnails are provided to the TV client to make browsing quick and easy. A tracking manager 634 collects service and content usage information, e.g., to price advertising and to improve the kind of content being offered generally or to particular users.

Transferring Settings from TV to Personality Adapter

In various embodiments, it may be desirable to automatically transfer user-selectable settings from the TV 102 to a personality adapter 104 so that the user does not have to manually input those settings each time that the personality adapter is used. Upon connecting the personality adapter 104 to the TV 102, a notification is transmitted from one device to the other when a setting or configuration is initially created or updated. The various devices can each include a configuration manager and a settings database to implement these features.

One communication interface that may be used to communicate setting information between the TV 102 and a personality adapter 104 is the USB channel 406 previously described. One advantage of USB technology is that, when a peripheral device is connected to a host's USB bus, the device is immediately recognized by the host, dynamically enumerated, and assigned an address. The host and the device then perform a query/response protocol to enable the host to obtain information about the device, such as the class of device and various other details that the host computer needs to know for its operation. This can include user-defined settings in the devices.

In one embodiment, the personality adapter 104 includes a settings database that stores various user-selected values associated with the personality adapter 104 that have been manually input by the user. The user can set the values for the various items in the settings database in a well-known manner through a user input (not shown) that may, for example, present a menu on the television or other display device.

Personality adapter 104 includes a configuration manager (e.g., microprocessor and associated software or firmware) for interacting with the TV 102 and for downloading from the TV 102 any available user-selectable settings that are needed by the personality adapter 104. The personality adapter's configuration manager includes a listing of the known fields for the personality adapter that are user-selectable as well as the currently selected values or settings for those fields. The personality adapter's configuration manager can determine those settings stored in TV 102 which are applicable to the personality adapter 104, and apply those settings to the personality adapter 104. The personality adapter's configuration manager can also send the personality adapter's settings to the TV 102 for future reference, such as in the event it becomes necessary to re-input the settings into the personality adapter 104 should it lose its previous settings.

Similarly, TV 102 includes a settings database that stores various user-selected values. The user can set the values for the various fields in the settings database in a well-known manner through a user input. The settings database saves the settings associated with the TV 102 as well as the settings used in the personality adapter 104.

In one embodiment, user-selected settings are accessed during initialization, e.g., during power on or reset, of the personality adapter 104 when it is connected to the TV 102 through the interface 108. At initialization, the personality adapter's configuration manager sends a query to the TV 102 requesting that the TV 102 access user-selected settings for various fields that have been stored in the TV 102 settings database. The requested settings are downloaded from the TV 102 to the personality adapter's configuration manager, which in turn processes the received information and then populates the fields of the personality adapter's settings database. More specifically, the personality adapter's configuration manager compares the current settings (if any) of each field in its settings database with settings received from the TV 102. For those fields in which the settings are not the same, the personality adapter's configuration manager replaces the settings in the personality adapter's settings database with the setting received from the TV 102 for the corresponding field.

If a user creates or updates a setting or configuration when the TV 102 is subsequently placed in communication with the personality adapter 104 or another device, the personality adapter's configuration manager will be notified of the change and will request the new setting for the field or fields that have been updated.

The personality adapter's configuration manager uses a configuration exchange protocol to communicate with the TV 102. This protocol exchanges data files that can be prepared and generated independently of the communication medium, e.g., a USB bus. That is, the contents and structure of the files can be independent of the medium the file is transported across. In one embodiment, the file format uses the eXtensible Markup Language (XML) to store the information, but a person skilled in the art will recognize that any structure can be used to store the information in the message. Similarly, the files sent to the personality adapter 104 can have similar or identical content, even though packaged for transmission along different media. Thus, for example, a file containing configuration settings can be sent along any communication medium, and can be understood by the personality adapter's configuration manager, even though sent along different communication media, and therefore packaged differently.

One reason for using a structure such as XML is that it decouples the content of the file from the communication medium. With the content of a file being independent from the communication medium over which the file is to be transmitted, personality adapter's configuration manager 67 does not have to deal with low level communication protocols. There are other advantages to an embodiment that uses a structure, like XML, that is independent of the communication medium. For example, when a message uses an encoding that packs the information and interprets a particular bit to have a particular meaning, both the TV 102 and the personality adapter 104 need to know how to generate and interpret such encodings. If the encoding is dependent on the communication medium used to transmit the message, the TV 102 and personality adapter 104 need to know how to generate and interpret multiple encodings, which increases complexity (since any change to the data to be transmitted might have to be propagated to each encoding). By using a structure like XML that is independent of the medium (and also independent of the protocol), the TV 102 and personality adapter 104 both only need to know how to interpret one structure: in the illustrative embodiment, XML.

It should be noted that the settings may be communicated to personality adapter 104 from the TV 102 in either a push or pull manner, depending on how the configuration exchange protocol is structured. In a typical client/server environment involving a pull, the client engages a server with a request for service or information. The server responds to the request and returns information to the client. This interaction is referred to as a pull because the customer is effectively pulling information from the server. In the example presented above the settings are communicated in the manner of a pull since the personality adapter 104 initiates the request. In a push interaction, the server is transmitting information to the client without explicit instruction from the client to do so. This interaction is referred to as a push because the server is effectively pushing information to the client. In the present case, the TV 102 may push the settings located in its settings database to the personality adapter 104 whenever they are connected to one another through the USB channel.

The ability to exchange settings between the TV 102 and personality adapter 104 in the manner described above provides a number of advantages. For example, it allows the user to avoid entering the same setting multiple times into each type of personality adapter. For instance, once a language option in the menu of the TV 102 is chosen to be English, that setting can be shared with various personality adapters that are connected to the TV 102. In addition, one device, such as the TV 102, for example, can store the settings of all of the personality adapters 104 in its nonvolatile memory. In the event that a personality adapter loses its settings, it can readily retrieve them from the TV 102 without requiring the user to manually re-enter them. The settings that can be retrieved may include those that are commonly shared among the personality adapters as well as those settings that are specific to the personality adapter retrieving them.

Another feature of the arrangement described above is that one device can query another concerning its settings. For example, if a first personality adapter has many of the same setting options as a second personality adapter, wants to use the settings from the second personality adapter, the first personality adapter can send a query to the TV 102 television to retrieve the second personality adapter's settings and forward them to the first personality adapter. The configuration manager in the first personality adapter can determine which settings obtained from the second personality adapter that are applicable to the first personality adapter. In this way, one device can collect the settings from another device and determine which settings are applicable for its purposes. The device will then only prompt the user to manually enter those settings that are not available from the other device.

Personality Adapter Security

It will be appreciated from the discussion above that various means can be employed to ensure that the TV 102 and a personality adapter 104 are authorized to communicate with each other. The intent of employing such means to allow the manufacturer of TV 102 to prevent counterfeit or unauthorized personality adapters 104 from being used in its television, and similarly, a manufacturer can prevent its personality adapters 104 from being used in a counterfeit or unauthorized television. The following discussion is intended to supplement the discussion above and provide additional details and/or embodiments of means for securing such communication.

It will be appreciated that a modern TV 102 typically includes, among other components, a microprocessor or the like for executing code in the form of software or firmware for operation of the television, including, but not limited to, rendering graphical user interfaces. Such a TV 102 also typically includes a data storage device such as an extended display identification data (EDID) electrically erasable programmable read only memory (EEPROM). Further, a typical high-definition television includes at least one HDMI-based interface, which itself may include interface storage such as an EEPROM or one-time programming (OTP) ROM. The processor is typically configured to execute programming stored in the EDID data storage device or other data storage device associated with the television.

TV 102 is provided by a particular manufacturer, and therefore, the manufacturer is in a position to supply TV 102 with encryption information. This encryption information, which may originate from the TV manufacturer directly or from a third-party interface licensor, can include television-unique encryption information as well as a list of authorized source encryption information. For example, in the case of an HDMI interface, the television-unique encryption information can be a High Definition Content Protection (HDCP) key selection vector (KSV) and, if desired, the KSV can be stored in memory typically associated with the HDMI interface. In this way, the KSV can be regarded as a public or private key that is used for authentication. The list may also be a list of KSVs associated with source devices, such as a personality adapter 104.

Additionally, a manufacturer ID authority may communicate with the television manufacturer to supply a manufacturer-unique ID to the television manufacturer. A list of authorized manufacturer IDs in turn can be stored in a television data storage device such as an extended display identification data (EDID) electrically erasable programmable read only memory (EEPROM). For example, the manufacturer ID authority may be an extended industry standard architecture (EISA) authority who can supply manufacturers with three-byte Institute of Electrical and Electronic Engineers (IEEE) manufacturer IDs.

With the above in mind, a television manufacturer may wish to restrict the use of personality adapters 104 to only those manufactured or supplied by that television manufacturer. The television manufacturer can also authorize partner companies, e.g., "subcontractors", to manufacture and supply personality adapters 104. For example, one approach would be for the television manufacturer to obtain from each approved subcontractor encryption information, such as HDCP KSVs, for each type of personality adapter that the subcontractor would like to have approved for operation with the manufacturer's televisions. The television manufacturer would then construct a data structure such as a table of encryption information associated with approved personality adapters, e.g., a table of the KSVs of the personality adapters that the subcontractor would allow to be operable with the manufacturer's televisions. If desired, the data structure can be partitioned by manufacturer ID (equivalently, separate data structures can be provided for each manufacturer ID). Of course, the television manufacturer may also be a provider of the personality adapters, in which case the encryption information associated with the personality adapters 104 that are provided by the television manufacturer would also entered into the approved device data structure.

Subsequent to manufacturer approval of subcontractor-supplied personality adapters 104, when a manufacturer's television is sold to a consumer and the consumer attempts to connect a personality adapter to the television, apart from any conventional use of the encryption information, e.g., apart from using HDCP KSVs for key exchange/authentication/ etc. in accordance with HDCP principles known in the art (or equivalently apart from using DTCP certificates for authentication), software or firmware executed by the microprocessor found in the television proceeds to determine whether the KSV (or other encryption information) presented by the source is in the data structure of approved source information. In this regard, the data structure may be provided to each manufacturer television and stored in, e.g., the television storage and/or interface storage. Alternatively, the television microprocessor may access a server database on the Internet which stores the data structure. If desired, the personality adapter 104 can also provide its associated manufacturer ID so that the search of the data structure, which can be partitioned by manufacturer ID, can be executed more quickly.

If the encryption information presented by the personality adapter 104 is not in the data structure of approved encryption information, the television disallows operation of the personality adapter 104. In essence, this portion of the logic is not encryption-based authentication since nothing is encrypted/ decrypted; instead, the information necessary for encrypting/ decrypting is merely examined to determine whether it is in the data structure of approved encryption information, without yet using it for encryption/decryption. Thus, the process can end even before conventional encryption-based authentication protocol is performed.

On the other hand, if the encryption information presented by the personality adapter 104 is in the data structure of approved encryption information, the television executes the encryption-based authentication protocol, which can include conventional HDCP key exchange, authentication, and so forth. If the encryption-based authentication protocol succeeds, the television allows the personality adapter 104 to operate; otherwise, operation of the personality adapter is disallowed. In some instances, the interface might not be operated with conventional encryption (e.g., HDCP) activated. In these cases, there would be no need for the HDCP key exchange, authentication, and so forth, and the personality adapter 104 could be allowed to operate based solely on its KSV being on the authorized list.

Another approach relies on data transfer over the HDMI and USB channels. As described previously, in various embodiments the interface 108 between a TV 102 and personality adapter 104 includes complementary HDMI and USB ports on those devices. The personality adapter 104 may further include a microprocessor that can execute code in the form of software or firmware stored on a data storage medium in the personality adapter. The storage medium on the personality adapter may be, without limitation, random access memory (RAM), read-only memory (ROM), disk-based storage, etc.

In one embodiment, the personality adapter 104 reads an encryption element from the TV 102 through the HDMI channel. For example, the encryption element can be the HDCP key of the TV 102, e.g., the key colloquially referred to as "Bksv".

The personality adapter 104 then returns the HDCP key to the TV 102 over the USB channel. When the TV's HDCP key is returned, the personality adapter 104 may encrypt it first, prior to sending it over the USB channel. The TV 102 compares the received encryption element (after decrypting it if necessary) with the encryption element that it sent to the personality adapter 104 over the HDMI channel and, if a match is found, returns a signal indicating that the HDMI and USB ports of the TV 102 are properly engaged with corresponding ports on personality adapter 104. This signal may result in displaying a message to the user using the TV 102 or not, but the import is that continued communication between the TV 102 and personality adapter 104 is permitted.

In contrast, if the TV 102 fails to find a matching encryption element returned over the USB channel, an "error" or other signal indicating that communication between the TV 102 and personality adapter 104 should cease, in that the personality adapter 104 was unable to return a proper encryption element over the USB channel. The TV 102 thereafter does not communicate with the personality adapter 104 unless and until the authentication process is repeated and is successful.

In an alternative embodiment, the personality adapter 104 reads an encryption element from the TV 102 through the HDMI channel. The encryption element can be a random number that is generated pursuant to HDCP authentication using the HDCP keys of the TV 102 and personality adapter 104, colloquially referred to as "Bksv" and "Aksv" respectively.

The personality adapter 104 returns the encryption element to the TV 102 over the USB channel. The TV 102 then compares the received encryption element (after decrypting it if necessary) with the encryption element that it sent to the personality adapter 104 over the HDMI channel. If a match is found, a signal is returned indicating that the HDMI and USB ports of the TV 102 are properly engaged with corresponding ports of the personality adapter 104. This signal may result in displaying a message to the user using the TV or not, but the import is that continued communication between the TV 102 and personality adapter 104 is permitted.

In contrast, if the TV 102 fails to find a matching encryption element returned over the USB channel, an "error" or other signal is returned indicating that communication between the TV 102 and personality adapter 104 should cease, in that the personality adapter 104 was unable to return a proper encryption element over the USB channel. The TV 102 thereafter does not communicate with the personality adapter 104 unless and until the authentication process is repeated and is successful.

The above authentication processes may be executed more than once. For example, since the HDCP random number is generated periodically, each time a new random number is generated the processes above can be executed to ensure continued legitimate reception of data in the USB channel.

Still another approach to protecting the TV 102 from communicating with a personality adapter 104 that is not pre-approved by television manufacturer, or authorized under, for example, a licensing agreement, is a "pairing" process. Once the communication interface is authorized, the TV 102 and personality adapter 104 are considered "paired" together. In a preferred embodiment, the TV 102 is able to "pair" with one or more personality adapters 104. The pairing of the devices may be transient, however, because the devices may be de-coupled or disconnected from each other and then re-attached or connected. Thus, the TV 102 may be able to subsequently pair back up with a personality adapter 104 with which it had previously authorized a communication interface.

In some less preferred variations of the present embodiment, the TV 102 may be configured to couple with only one personality adapter 104, and thus, the only authorized communication interface is with the personality adapter to which it is first coupled and with which it is determined that the coupling or pairing is approved and/or proper. In other variations, the TV 102 may be configured to couple with only a certain type of personality adapter (e.g., only personality adapters with acceptable attributes, such as, a specific authorized manufacturer), or, less preferably, with a predetermined number of personality adapters. Thus, it is possible to prevent a counterfeit or otherwise unauthorized personality adapter from functioning in TV 102.

In one embodiment, the pairing method begins when TV 102 detects the connection of a personality adapter 104 thereto. In some embodiments, a "coupling" is detected when the TV 102 and personality adapter 104 are coupled or connected together and, for example, the personality adapter 104 attempts to establish a communication interface with TV 102. Detecting the coupling may comprise, for example, TV 102 detecting a load being placed on a port. In some variations, detecting a load may comprise detecting a change in resistance, a change in current draw, a pin pulled to ground or any other method known in the art. For example, in some embodiments, detecting a coupling may comprise the TV 102 receiving a signal indicating that the personality adapter 104 is attempting to establish a communication interface. Further, detecting the coupling may also comprise detecting that it is a second or subsequent attempt to establish a communication interface.

In some variations of the present embodiment, the TV 102 may request some kind of identification from the personality adapter 104 to verify that the personality adapter 104 is authorized to communicate with the TV 102. The identification requested may be, for example, a certificate issued to the personality adapter 104 during manufacturing. The personality adapter 104 may be configured to send the certificate upon attempting to establish a communication interface or attempting to couple with the TV 102. In some variations, this identification is a pairing certificate, and at least the TV 102 and/or the personality adapter 104 is issued a unique pairing certificate prior to a customer purchasing the equipment. Further, in some embodiments the pairing certificate is secret and remains protected or encrypted upon submitting or transferring it in order to establish the communication interface.

In some embodiments, the TV 102 may request the pairing certificate from the personality adapter in a first attempt to establish a communication interface. In other embodiments, the personality adapter 104 may automatically submit the pairing certificate to the TV 102 upon detecting a coupling or a connection of the two and the fact that it is an initial attempt to establish a communication interface.

One step in the method is for the TV 102 to certify that the pairing certificate is valid. In some variations of the present embodiment, certifying that the pairing certificate is valid may comprise the TV 102 accessing a database or a table listing the type, manufacturer and/or unique identification information for each personality adapter 104 with which it is authorized to communicate. In some embodiments, the determination may include the TV 102 finding the manufacturer of the personality adapter the database of authorized manufacturers.

Alternatively or additionally, the TV 102 may find the unique identification information, such as the pairing certificate, of the coupling module listed in the database. The certifying of the pairing certificate is verification that the TV 102 and the personality adapter 104 are pre-approved to pair or pre-approved to authorize to establish a communication interface with each other. However, the communication interface between the two must still be authorized before the pairing of the TV 102 and personality adapter 104 may continue or communications is allowed.

Once the pairing certificate is certified, an operating certificate is issued to the personality adapter 104. The operating certificate is unique between the TV 102 and the personality adapter 104, and in some embodiments, once used, may not be regenerated or copied for use in another system. In some variations, the operating certificate is issued by TV 102 to the personality adapter 104. In other variations, the personality adapter 104 may receive the operating certificate from a remote device, for example, a server accessed over the internet. Furthermore, the operating certificate may be unique between more than two personality adapters, all of which are being paired to the TV 102 in an authorized communication interface.

In some variations, after the operating certificate is issued, the personality adapter 104 submits the operating certificate to the TV 102. Accordingly, the personality adapter 104 stores the operating certificate. In some variations, once the operating certificate has been issued and/or stored, the TV 102 may authorize the communication interface. In some variations, the TV 102 further confirms the operating certificate before authorizing the communication interface. Thus, the properly coupled TV 102 and personality adapter 104 are permitted to continue with paired communications over the authorized communication interface. In other words, the TV 102 and personality adapter 104 are paired together with a secure interface and may exchange information, and in some embodiments, are protected from migrating to or interfacing with another unauthorized device. In some embodiments, the pairing of the devices is certified at the point of certifying the pairing certificate, but is not confirmed and authorized until the operating certificate has been issued.

Additionally, because, in some embodiments, the operating certificate is unique between the TV 102 and the personality adapter 104, the TV 102 may be configured to recognize it was once paired with the personality adapter 104. Thus, the TV 102 may authorize the communication interface upon the TV 102 subsequently coupling to the personality adapter 104 by detecting it is a subsequent attempt to establish communication and thereby confirming the validity of the operating certificate.

By way of example, the personality adapter 104 may be a storage device that contains a new software application that a user desires to transfer to a TV 102 that is already configured with a personal computer (PC) personality adapter. An unauthorized personality adapter would not be allowed to transfer the new software application to the TV 102 unless the communication interface has been authorized. Thus, in some embodiments, the TV 102 authorizes the communication interface with the personality adapter 104 prior to transferring the new software application. Further, if the TV 102 is unable to authorize the communication interface, the TV 102 will pause communication until the interface has been authorized or, alternatively, may terminate communication with the personality adapter 104 if the interface is not authorized.

Continuing with the example above, the personality adapter 104 detects that it is being coupled to the PC-configured TV 102 and submits the pairing certificate appointed to the personality adapter at the time of manufacturing. The PC-configured TV is configured to review a list of pairing certificates to certify that the one submitted by the personality adapter 104 is valid. Once the PC-configured TV 102 certifies the pairing certificate of the personality adapter 104, an operating certificate is issued to the personality adapter 104, and is typically stored on the personality adapter 104. In some embodiments, the personality adapter 104 submits the operating certificate to the PC-configured TV 102; the PC-configured TV 102 confirms that the operating certificate is valid, and sends an authorization to the personality adapter 104 to allow paired communication. In other embodiments, receiving the operating certificate from personality adapter 104 indicates that the communication interface is authorized, and thus, the PC-TV 102 allows paired communication between the TV 102 and the PC. The personality adapter 104 is now authorized to transfer the new software application to the PC-configured TV 102.

Additionally, the personality adapter 104 may be removed from the PC-configured TV 102 and subsequently coupled again to the PC-configured TV 102. Upon a second or subsequent coupling, the communication interface between the personality adapter 104 and the PC-configured TV 102 must again be authorized. Thus, the personality adapter 104 may submit the previously issued operating certificate for the PC-configured TV 102 to confirm is valid. Once the personality adapter 104 again receives authorization from the PC-configured TV 102, the communication interface and paired communication are allowed. Thus, if needed, the personality adapter 104 may be authorized to again transfer the software application to the PC-configured TV 102.

It is noted, however, that the operating certificate is not configured for authorizing a communication interface between the personality adapter 104 and a different PC-configured TV 102. Thus, the personality adapter 104 will repeat the sequence for authorizing the communication interface with all other devices with which it is attempting to couple. In some embodiments, the personality adapter 104 may be unable to establish a communication interface with other devices in order to protect the software application on the personality adapter from being hacked or used in an unauthorized manner.

In some variations of the present embodiment, a personality adapter may be configured to couple with a predetermined maximum number of TVs 102. In some embodiments, one method of configuring the personality adapter to limit the number of televisions with which it may couple is by modifying the pairing certificate after a communication interface is authorized. For example, in some embodiments, the pairing certificate appointed to the personality adapter is stored in memory on the personality adapter prior to the customer purchasing the personality adapter. In some variations, the pairing certificate is modified by erasing the pairing certificate from memory after authorizing a first communication interface. Thus, the personality adapter is unable to submit the pairing certificate to another TV 102 after it has been erased, and accordingly, the module is limited to paired communication with only one TV 102.

In other embodiments, the pairing certificate may be modified by the personality adapter to indicate the number of TVs 102 with which it has previously submitted the pairing certificate, paired and/or authorized a communication interface (e.g., the number of interfaces the module has determined secure). And once the predetermined maximum number of TVs 102 with which the personality adapter pairs with is reached, for example, the personality adapter may be required to modify, erase and/or obliterate the pairing certificate. Thus, after modifying the pairing certificate, in some embodiments, the personality adapter is prevented from communicating with an additional TV 102.

Accordingly, in some embodiments, unauthorized devices can be prevented from using a proprietary interface. Additionally, unauthorized migration (e.g., removal from the originally paired device to another device) can be prevented. By way of example, a TV 102 pairs with and/or authorizes a communication interface with a personality adapter 104. The personality adapter 104 is then removed from the TV 102 and is connected to another TV 102. In some embodiments, the personality adapter 104 will be unable to authorize a second communication interface, and thus, is unable to migrate to and be used with another TV 102. By implementing the method described above, the personality adapter 104 will remain "paired" with the TV 102 and prevented from pairing with another device.

By way of example, the TV 102 detects a personality adapter coupling to the communication interface 108 by receiving, for example, a power-on signal, a hot plug detect signal, detecting an increase in current being drawn from the communication interface 108 or detecting a pin or signal line being pulled to ground. As described above, the communication interface 108 may be configured to initiate the authorization of communication between the TV 102 and the personality adapter 104 by requesting identification information.

In some embodiments, the personality adapter 104 may retrieve a pairing certificate, for example, from a storage device to submit to the TV 102 through the communication interface 108. In some embodiments, the pairing certificate is a unique identification code appointed to the personality adapter 104, indexed in a database and installed or stored in the storage device prior to the customer purchasing the personality adapter 104.

As described above, in some embodiments, the TV 102 first certifies that the personality adapter 104 is authentic and is a pre-approved device with which the TV 102 may couple. In some embodiments, this is accomplished by the certifying module or process certifying that the pairing certificate submitted by the personality adapter 104 is valid. In some variations of the present embodiment, the certifying module or process may access information in the database to compare the pairing certificate to the indexed list of acceptable personality adapters with which to the TV 102 may pair.

In some embodiments, the database information accessed by the certifying module or process is stored locally, for example, in memory in the TV 102. In other embodiments, the certifying module or process accesses the database information that is stored, for example, on a remote server. In some embodiments, the certifying module or process may periodically access the remote server over the Internet to download and locally store updated information in the database, such that when an attempt to secure an interface is made, the certifying module or process can access the database rapidly.

In some variations of the present embodiment, the TV 102 and the personality adapter 104 may exchange pairing certificates and individually verify the other device is acceptable or pre-approved with which to pair. In yet other embodiments, each of the TV 102 and the personality adapter 104 include certifying module or process, and, for example, may further be configured to access a server on a network in order to certify the submitted pairing certificate is listed in the database of pre-approved devices with which to pair.

Once the pairing certificate has been certified, an operating certificate may be issued to the personality adapter 104. In some variations, the personality adapter 104 is configured to receive the operating certificate, and must do so in order to obtain authorization to communicate with TV 102. In some embodiments, the issued operating certificate may be stored on the personality adapter 104 for future pairing.

In some embodiments, the certifying module or process issues the operating certificate to the personality adapter 104, and the personality adapter 104 waits for confirmation of authorization after submitting the new operating certificate to the TV 102. In other embodiments, the TV 102 issues the operating certificate to the personality adapter 104 indicating the communication interface is authorized, and thus allowing paired communication. In other variations, once the operating certificate is issued and/or submitted for confirmation by the personality adapter 104, the communication interface between the TV 102 and the personality adapter 104 is authorized, and the devices allow paired communication.

In some embodiments, the issued operating certificate may be stored in the storage device and submitted and certified upon a subsequent coupling of the TV 102 and the personality adapter 104. However, in addition to limiting the number of TVs 102 with which the personality adapter 104 may pair, the system may limit the number of times the TV 102 and the personality adapter 104 may pair in similar methods.

In some embodiments, the pairing certificate is secret identification information appointed to the personality adapter 104 by the manufacturer, for example, and is stored in a storage device. The storage device may be flash or non-volatile memory configured to be modified by the personality adapter 104. Thus, once the TV 102 authorizes a communication interface with the personality adapter 104, the personality adapter 104 may erase or modify the pairing certificate stored in the storage device. Accordingly, once the personality adapter 104 erases the pairing certificate, for example, the personality adapter 104 is unable to subsequently pair or authorize a communication interface with other devices, as the information required for authorization is no longer available.

In some embodiments, the TV 102 may detect when a personality adapter is connected to the TV 102. In some embodiments, the TV may detect a coupling by receiving, for example, a power-on signal or hot-plug detect signal from the personality adapter 104 at the communication interface 108. After detecting the coupling of the device, an authorization sequence is initiated either by the TV 102 or the personality adapter 104. In some embodiments, the personality adapter 104 initiates the authorization by submitting a pairing certificate to the TV 102, or, for example, the TV 102 may initiate the authorization sequence by requesting identification information from the personality adapter 104 attempting to communicate. Next, the TV 102 certifies the pairing certificate through a certifying module or process, for example, by locating the pairing certificate in a database listing devices that are pre-approved for communication. After certifying that the pairing certificate is valid, the TV 102 issues the personality adapter 104 an operating certificate.

Accordingly, in some embodiments, the personality adapter 104 confirms authorization by submitting the issued operating certificate to the TV 102. Once the TV 102 confirms the operating certificate is valid, the communication interface between the TV 102 and the personality adapter 104 is authorized. At this point the personality adapter 104 may modify or destroy the pairing certificate. In some embodiments, the personality adapter 104 stores the operating certificate in the storage device, or, for example, replaces the pairing certificate with the operating certificate. Accordingly, if the personality adapter 104 is removed from the TV 102, upon a subsequent coupling, the personality adapter 104 submits the operating certificate again to the TV 102. The TV 102 confirms the operating certificate to be valid. At this point, the TV 102 and the personality adapter 104 authorize the communication interface, and operational status is reached wherein the TV 102 and personality adapter 104 are paired together and are allowed to communicate over the authorized communication interface.

In some embodiments, the certifying module or process is on the TV 102, and may be configured to access a server over a wide area network when certifying the pairing certificate. Additionally or alternatively, the certifying module or process on the TV 102 may be configured to download, over a network, a list from the database of possible pairing certificates for personality adapters 104 with which the TV 102 is pre-approved to communicate. Additionally, the certifying module or process on the TV 102 may be configured to receive and/or retrieve operating certificates from a server over a network and transfer the operating certificates to personality adapters 104 with which the TV 102 has certified are proper or pre-approved with which to pair. In other embodiments, the certifying module or process may be configured to generate the operating certificates for the personality adapter 104.

As mentioned above, a storage device on the personality adapter 104 may be configured to store the pairing certificate. In some embodiments, the TV 102 and/or the personality adapter 104 are designed with a communication interface that is configured to use High-Bandwidth Digital Content Protection (HDCP). When using the HDCP licensed format, a key selection vector is used that has a unique value, which is somewhat like a public key, to communicate with other devices. In some embodiments, this key may be appointed and registered in connection with the device when it is manufactured. This key may be used to track a device and may be used in generating the secret identification code, e.g., the pairing certificate, for the device and indexing the secret identification code in a database. Additionally, the TV 102 and/or the personality adapter 104 may have access to the database containing a table listing the key selection vector, the secret identification code and/or pairing certificate, the manufacturer, and the corresponding device, for example.

The coupling devices may use this database in order to verify a key actually belongs to the device that is attempting to couple, and is thus valid. This is a method that may be implemented; however, is not necessary to practice the described embodiments.

In some embodiments, the personality adapter 104 may be configured to access the storage device a predetermined maximum number of times. In some embodiments, this could limit the number of times that the personality adapter 104 accesses the storage device to submit the pairing certificate to the TV 102 or, for example, limit the number of times the storage device is accessed to modify the pairing certificate after receiving an operating certificate. This enables a manufacturer to monitor and/or limit the number of TVs 102 with which the personality adapter 104 is capable of pairing and authorizing a communication interface. By way of example, if the personality adapter 104 authorizes a communication interface with the TV 102, and the user attempts to move the personality adapter 104 to another TV 102, the personality adapter 104 may not be able to authorize a communication interface with the new TV 102 if the pairing certificate of the personality adapter 104 has been submitted the maximum number of times, or, for example, the pairing certificate has been modified or erased such that it may not be certified by the certifying module or process anymore.

In some variations of the present embodiment, the TV 102 and/or the personality adapter 104, having already been paired in an authorized communication interface, may detect a coupling of a third device (e.g., a second personality adapter 104). Thus, in some embodiments, at least one of the TV 102 and/or the first personality adapter 104 receives a second pairing certificate from the second personality adapter 104, and certifies that the pairing certificate is valid between the second personality adapter 104 and the at least one of the TV 102 and the first personality adapter 104. After certifying that the second pairing certificate is valid, a second operating certificate is issued and is stored on at least one of the TV 102, the first personality adapter 104, and the second personality adapter. Thus, the communication interface between the second personality adapter 104 and the at least one of the TV 102 and/or the first personality adapter 104 is authorized, and the second personality adapter 104 allows paired communication over the authorized communication interface. In some embodiments, the second personality adapter 104 may be paired with only one of the TV 102 and the first personality adapter 104. In other embodiments, the second personality adapter 104 may be paired with both the TV 102 and the first personality adapter 104.

In some embodiments, a TV 102 and a personality adapter 104 are connected together, and TV 102 may begin to establish communication by first certifying if there is a valid operating certificate. In some embodiments, the operating certificate is automatically submitted or exchanged by the personality adapter 104; in some instances, the operating certificate is provided upon request of the TV 102. If there is a valid operating certificate, then the communication interface is authorized and the devices are allowed paired communication over the authorized communication interface.

If there is not a valid operating certificate, then the personality adapter 104 may submit the pairing certificate, either automatically or upon request, and the TV 102 certifies that the coupling module's pairing certificate is valid. By way of example, the TV 102, manufactured by company X, may determine the pairing certificate is not valid, for example, because the personality adapter 104 was manufactured by company Y. Thus, the TV 102 determines the interface is not proprietary and thus, not authorized. Accordingly, communication between the TV 102 and the personality adapter 104 is denied and terminated.

However, if the TV 102 determines the pairing certificate is valid, then an operating certificate may be issued to the personality adapter 104. And accordingly, the communication interface is authorized between the TV 102 and the personality adapter 104, and the pair of devices proceeds with paired communication.

In other embodiments, the personality adapter 104 may have previously coupled with the TV 102 a maximum number of times, and accordingly, the personality adapter 104 has erased the pairing certificate after the last time the TV 102 authorized a communication interface and permitted pairing. Thus, the TV 102 fails to certify the pairing certificate is valid and accordingly, determines the interface is not authorized and denies communication.

By way of example, the personality adapter 104 may be configured to provide new features, applications, capabilities and/or functionality to the TV 102. Thus, the various embodiments of above described method may be used to protect the personality adapter 104 from communicating with more than a maximum number of TVs 102, and thus, protecting the personality adapter 104 from transferring these capabilities to unauthorized televisions. In other embodiments, the above described variations of method may be used when it is desirable to pair the TV 102 with the personality adapter 104 in order to secure the devices together and limit the use of the personality adapter with other televisions. Thus, the method may be used to protect a personality adapter and an interface from hacking and non-licensed usage.

In another embodiment, the TV 102 may be considered a host device and the personality adapter 104 may be considered a coupling device.

In some embodiments, the host device comprises a communication interface configured to communicate with the coupling device. Additionally, the communication interface of the host device may be coupled to or in communication with a certifying module. In some embodiments, the certifying module may be a separate device coupled to the host device over a cable, wire, or wirelessly, or, for example, the certifying module may be configured on or part of the host device.

In one embodiment, the communication interface of the host device detects that a coupling device is being coupled to the host device. Accordingly, the host device initiates an authorization sequence to determine if the coupling device is configured and/or approved to interface with the host device.

In some embodiments, the coupling device may respond to the initiation of the authorization sequence by transmitting a certificate of identification received by the host device. The certifying module may first confirm that the certificate of identification is a valid operating certificate. If the certificate is a valid operating certificate, then the host device authorizes the communication interface and allows communication with the coupling device.

If the certificate is not a valid operating certificate, then the certifying module determines if the certificate is a valid pairing certificate. If the host device fails to certify the certificate is a valid pairing certificate and a valid operating certificate, then the host device denies communication with the coupling device. Thus, if the coupling device had previously paired with another host device, the previously authorized communication interface remains secure, and the coupling device is restricted from communicating with a new host device.

If the certifying module determines the certificate of identification is a valid pairing certificate, then the certifying module may issue an operating certificate to the coupling device. Accordingly, the host device authorizes the communication interface with the coupling device and allows paired communication. Furthermore, in some embodiments, the interface between the host device and the coupling device is secured, and the coupling device may not be capable authorizing a communication interface with another host device.

In another embodiment, a coupling device comprising a communication interface may attempt to communicate with a host device as described above. In some embodiments, the coupling device may also comprise a modifiable storage device coupled to the communication interface, wherein the modifiable storage device is configured to store a pairing certificate. The storage device may also be configured to store an operating certificate issued to the coupling device.

In this embodiment, the communication interface is configured to detect the coupling device is being coupled to a host device. In some embodiments, the coupling device may be configured to identify that the coupling device has not previously attempted to establish a communication interface with the host device, and thus, this is an initial coupling. Then, the coupling device retrieves the pairing certificate from the storage device and submits the pairing certificate to the host device.

The coupling device is configured to wait to receive an operating certificate from the host device. Accordingly, the coupling device determines if an operating certificate was received, and, if an operating certificate was not received, then the coupling device pauses communication until the operating certificate is received. Once the operating certificate is received, the coupling device will modify the pairing certificate. Accordingly, the coupling device authorizes the communication interface of the host device and proceeds with paired communication. It is noted that the host device may not certify the coupling device, and thus, the pause in communication by the coupling device may be indefinite.

In another embodiment, as described above, a coupling device comprising a communication interface may attempt to couple (e.g., attempt to establish a communication interface) with a host device. In some embodiments, the coupling device determines that it has previously coupled to and/or attempted to establish a communication interface with the host device. Thus, the coupling device detects it is a subsequent coupling with the host device. Next, the coupling device submits the previously issued operating certificate. The coupling device waits to receive confirmation from the host device that the operating certificate is valid. Thus, the coupling device will pause communication until the confirmation is received. If confirmation is never received, then the communication interface is not authorized and communication is not allowed. If the coupling device does receive confirmation of authorization, then the coupling device authorizes the communication interface with the host device and proceeds with paired communication.

In some embodiments, the modifiable storage device of the coupling device may be configured to modify or destroy the operating certificate after subsequently pairing with the host device a predetermined maximum number of times. Additionally, the coupling device may be configured to restore the original pairing certificate after receiving authorization, for example, from the manufacturer. For example, in the case of an exchange, warranty, or repair, the pairing certificates may be re-initialized as long as their serial numbers and other pertinent information were previously registered with the company after purchase. In some embodiments, this may promote and increase the customer's effort to send in the product's registration information to the manufacturer or licensing company.

In other embodiments, such as a demonstration unit used in a retail store to promote the product, the devices could be temporarily paired while operating in a demonstration mode. Accordingly, the device may comprise additional hardware or software protection in order to prevent the customer from making use of the demonstration mode. Alternatively, the store may initially register the product with the manufacturing or licensing company, and re-initialize the pairing certificate with authorization when the unit is sold to a customer.

Depending on the application, in some embodiments the pairing of the devices may be apparent to the user at the initial pairing, for example, by some kind of user interface warning. And in other embodiments, the pairing and securing the interface may be transparent to the user.

In another embodiment, as described above, a coupling device attempts to communicate with a host device. The coupling device may detect the coupling and the communication attempt and may automatically submit a certificate of identification to the host device. Next, the coupling device may pause communication until it receives either an operating certificate or confirmation of authorization. Accordingly, if this is the initial coupling of the coupling device to the host device, once the host device has certified the certificate of identification to be a valid pairing certificate, the host device will send, and the coupling device will receive, the issued operating certificate. Once the coupling device receives the operating certificate, then the coupling device modifies the pairing certificate. Thus, accordingly, the coupling device authorizes the communication interface between the host device and the coupling device, and allows communication.

Additionally, if this is a subsequent coupling of the coupling device to the host device, then the host device sends, and the coupling device receives, confirmation that the certificate of identification is a valid operating certificate. Accordingly, the coupling device authorizes the communication interface between the host device and the coupling device, and allows communication.

It is noted that although some embodiments described herein include only a TV 102 and a personality adapter 104, the embodiments may be implemented when more than two modules are coupling together. For example, the TV 102 may couple with the personality adapter 104 and a third module. In other variations, the personality adapter 104 may couple with the TV 102 at a first communication interface and the third module at a second communication interface. Thus, while the invention herein disclosed has been described by means of specific embodiments, examples and applications thereof, numerous modifications and variations could be made thereto by those skilled in the art without departing from the scope of the invention set forth in the claims.

In the interest of conciseness, various embodiments described above assume that it is the TV 102 that is the host device and that the personality adapter 104 is the coupling device. However, the same methodologies may be used where the personality adapter 104 is the host device and the TV 102 is the coupling device.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

What is claimed is:

1. An automatically reconfigurable multimedia system, comprising:
    a first device, said first device having a docking port or slot for receiving a second device to which it supplies signals and power, and a secure communications interface configured for receiving audio-video content from said second device, and for receiving a configuration template from said second device, and for communicating with said second device, said first device having a video display and an audio output; and
    a second device, said second device having a secure communications interface configured for providing said audio-video content to said first device, for providing said configuration template to said first device, and for communicating with said first device;
    said first device having a configuration rendering engine for generating a user interface on said video display based on information contained in said configuration template;
    wherein said first device and said second device cooperate in authorizing multimedia content transfers across the secure communications interface, to prevent unlicensed materials from being output by the second device and/or being accepted by the first device;
    wherein said secure communications interface includes an HDMI interface and a USB interface; and
    wherein authentication of the second device is performed over the combination of USB interface and HDMI interface to ensure that the HDMI and USB connections are made on the same first device.

2. A system as recited in claim 1, wherein said user interface provides access to operation of said second device.

3. A system as recited in claim 1, further comprising:
    a remote commander device associated with said first device;
    said remote commander device capable of accessing user-available functions that are controlled by the configuration template;
    wherein said remote commander device communicates with said second device through said interfaces to control its particular functions in addition to controlling functions of said first device.

4. A system as recited in claim 1, wherein communication between said first and second devices is provided over said USB interfaces.

5. A system as recited in claim 1, wherein said first device includes means for authenticating said second device through the interface with said second device as a condition to allowing operation of said second device with said first device.

6. A system as recited in claim 1, wherein said second device is selected from a group of devices that vary in functionality or audio-video content they each can provide to said first device.

7. A system as recited in claim 1:
    wherein said first device comprises a television;
    wherein said second device comprises a network adapter for providing communications capability between said television and a network; and
    wherein said configuration template automatically reconfigures said television for network communications through said network adapter.

8. A system as recited in claim 7, wherein said network adapter is configured for connecting said television to a wired network.

9. A system as recited in claim 7, wherein said network adapter is configured for connecting said television to a wireless network.

10. A system as recited in claim 1:
    wherein said first device comprises a television;
    wherein said second device comprises a storage adapter for providing mass storage for said television; and
    wherein said configuration template automatically reconfigures said television for accessing and displaying audio content, video content, or both audio and video content stored on said storage adapter.

11. A system as recited in claim 10, wherein said storage adapter is configured for storing photographs or videos for display on said television.

12. A system as recited in claim 10, wherein said storage adapter is configured for storing music for playback on said television.

13. A system as recited in claim 1:
    wherein said first device comprises a television;
    wherein said second device comprises a cable adapter for receiving cable programming on said television; and
    wherein said configuration template automatically reconfigures said television for selecting and viewing cable television content on said television through said cable adapter.

14. A system as recited in claim 1:
    wherein said first device comprises a television; and
    wherein said second device is configured for streaming audio and video from said television to a personal computer or other client device through a wired or wireless network connection.

15. A system as recited in claim 1:
    wherein said first device comprises a television; and
    wherein said second device is configured for operation of said television as a personal computer.

16. A system as recited in claim 1:
    wherein said first device comprises a television; and
    wherein said second device comprises a broadcast adapter for receiving over the air broadcasts on said television; and
    wherein said configuration template automatically reconfigures said television for selecting and viewing over the air broadcasts on said television through said broadcast adapter.

17. A system as recited in claim 1:
    wherein said first device comprises a television;
    wherein said second device is configured for the interconnection of an audio-video device selected from the group of devices consisting essentially of Blu-ray Disc™ devices, DVD devices, VHS devices, PVR devices, DVR devices, IP-TV devices, video game devices, set-top box devices, and digital or analog music devices; and
    wherein a configuration template from said second device automatically reconfigures said television to access and operate each said audio-video device.

18. A system as recited in claim 1, further comprising:
a remote commander device;
wherein said first device and said second device are both operable by said remote commander; and
wherein said configuration template automatically reconfigures said first device to accept particular commands from said remote commander device for operation of said second device through said first device.

19. A system as recited in claim 1, further comprising:
a network content server for connection to said second device as a network client, and providing for navigation by a user of said first device to search through lists and select-for-play particular ones of said audio-video content, and that provides corresponding configuration templates in background to be used to automatically configure an appropriate user interface.

20. An automatically reconfigurable television apparatus, comprising:
a docking port or slot on a television apparatus for receiving a personality adapter device to which it supplies signals and power, and a secure communications interface having a first interface and a second interface;
said first interface, between said television apparatus and the personality adapter, over which audio-video content can be received from an external device;
said second interface, between said television apparatus and the personality adapter, paired with said first interface which enables communication through the personality adapter with an external device for controlling operation of the external device through said television apparatus;
a dynamic menu that automatically reconfigures in response to connection of the external device to said television apparatus and through which operation of the external device is controlled and audio-video content from the external device is accessed; and
a configuration rendering engine that receives a configuration template from the external device and controls reconfiguration of said dynamic menu;
wherein said television apparatus and the personality adapter cooperatively utilize said first interface and said second interface in authorizing multimedia content transfers across the secure communications interface, to prevent unlicensed materials from being output by the personality adapter and/or being accepted by said television apparatus;
a high definition multimedia interface (HDMI) interface included in the first interface;
a universal serial bus (USB) included in the second interface;
wherein said secure communications interface is configured for authorizing interoperation of said television apparatus with an external device connected to said HDMI and USB interfaces; and
wherein authentication of the personality adapter and any said external device is performed over the combination of USB interface and HDMI interface to ensure that the HDMI and USB connections are made on the same first device.

21. A television apparatus as recited in claim 20, further comprising means for authenticating said external device as a condition to allowing operation of said external device with said television apparatus.

22. A television apparatus as recited in claim 20, further comprising:
an identity device for identifying the television apparatus and its capabilities to an external device connected to said HDMI and USB interfaces.

23. A television apparatus as recited in claim 20, further comprising:
a pairing device for verifying to an external device connected to said HDMI and USB interfaces that both said interfaces belong to a single device, wherein spoofing of protected-content security measures is prevented.

24. A television apparatus as recited in claim 20, further comprising:
an encryption device associated with said remote commander device and providing for the prevention of substituting said remote commander device with another similar device.

25. A television apparatus as recited in claim 20, further comprising:
a non-volatile memory for storing user preferences and for automatically updating said external device with such user preferences when connected to said television apparatus, wherein a user is relieved of having to repeat the entry of said user preferences.

26. A television apparatus as recited in claim 20, further comprising:
a high-bandwidth digital content protection (HDCP) circuit for authorizing said external device when connected to said television apparatus to deliver high-definition audio-video content to said television apparatus.

27. A television apparatus as recited in claim 20, further comprising:
a high-bandwidth digital content protection (HDCP) circuit for authorizing said external device when connected to said television apparatus to deliver high-definition audio-video content to said television apparatus; and
a security device for authorizing interoperation with said external device that uses a key selection vector (KSV) from the HDCP circuit.

28. A television apparatus as recited in claim 20, wherein said external device is selected from a group of devices that vary in functionality or audio-video content they each can provide to said television apparatus.

29. A television apparatus as recited in claim 20:
wherein said external device comprises a network adapter for providing communications capability between said television apparatus and a network; and
wherein said configuration template automatically reconfigures said television apparatus for network communications through said network adapter.

30. A television apparatus as recited in claim 29, wherein said network adapter is configured for connecting said television to a wired network.

31. A television apparatus as recited in claim 29, wherein said network adapter is configured for connecting said television to a wireless network.

32. A television apparatus as recited in claim 20:
wherein said external device comprises a storage adapter for providing mass storage for said television apparatus; and
wherein said configuration template automatically reconfigures said television apparatus for accessing and displaying audio content, video content, or both audio and video content stored on said storage adapter.

33. A television apparatus as recited in claim 32, wherein said storage adapter is configured for storing photographs or videos for display on said television apparatus.

34. A television apparatus as recited in claim 32, wherein said storage adapter is configured for storing music for playback on said television apparatus.

35. A television apparatus as recited in claim 20:
wherein said external device comprises a cable adapter for receiving cable programming on said television apparatus; and
wherein said configuration template automatically reconfigures said television apparatus for selecting and viewing cable television content on said television apparatus through said cable adapter.

36. A television apparatus as recited in claim 20:
wherein said external device is configured for streaming audio and video from said television apparatus to a personal computer or other client device through a wired or wireless network connection.

37. A television apparatus as recited in claim 20:
wherein said external device is configured for operation of said television apparatus as a personal computer.

38. A television apparatus as recited in claim 20:
wherein said external device comprises a broadcast adapter for receiving over the air broadcasts on said television apparatus; and
wherein said configuration template automatically reconfigures said television apparatus for selecting and viewing over the air broadcasts on said television apparatus through said broadcast adapter.

39. A television apparatus as recited in claim 20:
wherein said external device comprises an audio-video device selected from the group of devices consisting essentially of Blu-ray Disc™ devices, DVD devices, VHS devices, PVR devices, DVR devices, IP-TV devices, video game devices, set-top box devices, and digital or analog music devices; and
wherein a configuration template, from said personality adapter, associated with each said external device automatically reconfigures said television apparatus to access and operate said external device.

40. A television apparatus as recited in claim 20, further comprising:
a remote commander device;
wherein said television apparatus and said external device are both operable by said remote commander device; and
wherein said configuration template automatically reconfigures said television apparatus to accept particular commands from said remote commander device for operation of said external device through said television apparatus.

41. A television apparatus as recited in claim 20:
wherein said external device comprises a network client device;
wherein said network client device is configured for connection to a network content server; and
wherein said network client device provides for navigation by a user of said television apparatus to search through lists and select-for-play particular ones of said audio-video content, and that provides corresponding configuration templates in background to be used to automatically configure an appropriate user interface.

42. A personality adapter device for use with a television apparatus, comprising:
a first interface over which audio-video content can be transferred to a television apparatus;
a second interface paired with said first interface which enables communication with the television apparatus for controlling operation of said device through the television apparatus;
wherein said first interface and said second interface provide secure communications interfacing when the personality adapter device is engaged within a docking port or slot of the television apparatus;
wherein the combination of said interface and said second interface cooperate in authorizing multimedia content transfers across the secure communications interface to prevent unlicensed materials from being output by the personality adapter and/or being accepted by the television apparatus;
a configuration template stored in memory in said personality adapter device;
wherein said configuration template can be transferred to said television apparatus over at least one of said first interface and second interface for automatic reconfiguration of a menu in the television apparatus in response to connection of said personality adapter device to the television apparatus;
wherein operation of said personality adapter device can be controlled and audio-video content from said personality adapter device can be accessed through said menu;
a high definition multimedia interface (HDMI) interface included in the first interface;
a universal serial bus (USB) included in the second interface; and
means for authorizing interoperation of said personality adapter device with a television apparatus connected to said HDMI and USB interfaces.

43. A personality adapter device as recited in claim 42, further comprising means for authenticating said personality adapter device as a condition to allowing operation of said device with said television apparatus.

44. A personality adapter device as recited in claim 42, further comprising:
means for identifying a television apparatus connected to said HDMI and USB interfaces and its capabilities.

45. A personality adapter device as recited in claim 42, further comprising:
means for verifying that a single television apparatus is connected to both said HDMI and USB interfaces, wherein spoofing of protected-content security measures is prevented.

46. A personality adapter device as recited in claim 42, wherein said personality adapter device is configured with one or more proprietary connectors to increase security so that only authorized security adapters can operate when engaged within the docking port or slot of the television apparatus.

47. A personality adapter device as recited in claim 42, wherein said personality adapter device is selected from a group of devices that vary in functionality or audio-video content they each can provide to said television apparatus.

48. A personality adapter device as recited in claim 42:
wherein said personality adapter device comprises a network adapter for providing communications capability between said television apparatus and a network; and
wherein said configuration template automatically reconfigures said television apparatus for network communications through said network adapter.

49. A personality adapter device as recited in claim 48, wherein said network adapter is configured for connecting said television apparatus to a wired network.

50. A personality adapter device as recited in claim 48, wherein said network adapter is configured for connecting said television apparatus to a wireless network.

51. A personality adapter device as recited in claim 42:
   wherein said device comprises a storage adapter for providing mass storage for said television apparatus; and
   wherein said configuration template automatically reconfigures said television apparatus for accessing and displaying audio content, video content, or both audio and video content stored on said storage adapter.

52. A personality adapter device as recited in claim 51, wherein said storage adapter is configured for storing photographs or videos for display on said television apparatus.

53. A personality adapter device as recited in claim 51, wherein said storage adapter is configured for storing music for playback on said television apparatus.

54. A personality adapter device as recited in claim 42:
   wherein said device comprises a cable adapter for receiving cable programming on said television apparatus; and
   wherein said configuration template automatically reconfigures said television apparatus for selecting and viewing cable television content on said television apparatus through said cable adapter.

55. A personality adapter device as recited in claim 42: wherein said device is configured for streaming audio and video from said television apparatus to a personal computer or other client device through a wired or wireless network connection.

56. A personality adapter device as recited in claim 42: wherein said device is configured for operation of said television apparatus as a personal computer.

57. A personality adapter device as recited in claim 42:
   wherein said device comprises a broadcast adapter for receiving over the air broadcasts on said television apparatus; and
   wherein said configuration template automatically reconfigures said television apparatus for selecting and viewing over the air broadcasts on said television apparatus through said broadcast adapter.

58. A personality adapter device as recited in claim 42:
   wherein said personality adapter device is configured for the interconnection of an external audio-video device selected from the group of devices consisting essentially of Blu-ray Disc™ devices, DVD devices, VHS devices, PVR devices, DVR devices, IP-TV devices, video game devices, set-top box devices, and digital or analog music devices; and
   wherein a configuration template, from said personality adapter device, associated with each said external audio-video device automatically reconfigures said television apparatus to access and operate said external device.

59. A personality adapter device as recited in claim 42:
   wherein said personality adapter device comprises a network client device;
   wherein said network client device is configured for connection to a network content server; and
   wherein said network client device provides for navigation by a user of the television apparatus to search through lists and select-for-play particular ones of said audio-video content, and that provides corresponding configuration templates in background to be used to automatically configure an appropriate user interface.

60. A personality adapter device as recited in claim 42: wherein said configuration template reconfigures the television apparatus to accept particular commands from a remote commander device, which controls operation of the television apparatus, for operation of said personality adapter device through the television apparatus.

61. An audio-video system, comprising:
   a television set with a video display screen, audio circuits, a main menu, and a remote commander;
   wherein said television set is configured with a docking port or slot for receiving an adapter to which it supplies signals, power, and secure communications;
   a high definition multimedia interface (HDMI) interface accessed through the docking port or slot of the television set through which video content can be accepted for said video display screen;
   a TV-set adapter configured for connection to the HDMI interface in said docking port or slot for providing said video content according to user selections with the remote commander, and for making automatic adjustments to said main menu; and
   a user interface for rendering on the video display screen and providing for a look and feel described in a user interface template forwarded by the TV-set adapter that was associated with a particular video content;
   wherein the television set and said TV-set adapter cooperate in authorizing multimedia content transfers across the secure communications interface, to prevent unlicensed materials from being output by said TV-set adapter and/or being accepted by the television set;
   a serial bus interface between the television set and TV-set adapter and providing for data exchanges in excess of what the HDMI interface can support alone; and
   a protocol disposed in both the television set and TV-set adapter that provides for verification that matched pairs of the HDMI and serial bus connections are part of a single device, and thereby frustrate attempts at spoofing.

62. An audio-video system as recited in claim 61, further comprising:
   an Internet connection disposed on the TV-set adapter and providing for access to an Internet services server that can provide audio-video content and associated user interface templates.

63. An audio-video system as recited in claim 61, further comprising:
   a memory module connection disposed on the TV-set adapter and providing for access to images obtained by a digital camera and introduced by a memory module.

64. An audio-video system as recited in claim 61, further comprising:
   a high-bandwidth digital content protection that supports the HDMI interface and authorizes content sources attached to the television set to provide high definition video.

65. An audio-video system as recited in claim 61, further comprising:
   a set back box (SBB) in which the TV-set adapter is included, and having a power input provided by the television set, and able to plug into at least one of a plurality of HDMI interfaces provided on the television set.

66. An audio-video system as recited in claim 61, further comprising:
   a modem disposed on the TV-set adapter and providing for access to the Internet;
   an Internet navigation device responsive to said remote commander and able to populate said user interface with information; and
   an array of databases, server, and network elements for connection to the Internet that can implement the identification and delivery of uniform resource indicator (URI) links and associated metadata for audio-video content as browsed by the Internet navigation device.

67. An audio-video system as recited in claim 61, further comprising:
a touch screen disposed on the video display screen that is coordinated with said user interface, and that provides a device to control the selection and play of audio-video files from various content sources.

68. An audio-video system as recited in claim 61, further comprising:
a transactional server and enterprise back-end accessible over the Internet and providing for content record searches with user interface pages and style sheets rendered to a TV client, and for providing thumbnails and content record links for audio-video content gathered from the Internet.

69. An automatically reconfigurable television apparatus, comprising:
a docking port or slot on a television apparatus for receiving a personality adapter device to which it supplies signals and power, and a secure communications interface having a first interface and a second interface;
said first interface, between said television apparatus and the personality adapter, over which audio-video content can be received from an external device;
said second interface, between said television apparatus and the personality adapter, paired with said first interface which enables communication through the personality adapter with an external device for controlling operation of the external device through said television apparatus;
a dynamic menu that automatically reconfigures in response to connection of the external device to said television apparatus and through which operation of the external device is controlled and audio-video content from the external device is accessed; and
a configuration rendering engine that receives a configuration template from the external device and controls reconfiguration of said dynamic menu;
wherein said television apparatus and the personality adapter cooperatively utilize said first interface and said second interface in authorizing multimedia content transfers across the secure communications interface, to prevent unlicensed materials from being output by the personality adapter and/or being accepted by said television apparatus;
a high definition multimedia interface (HDMI) interface included in the first interface;
a universal serial bus (USB) included in the second interface; and
a pairing device for verifying to an external device connected to said HDMI and USB interfaces that both said interfaces belong to a single device, wherein spoofing of protected-content security measures is prevented.

70. A personality adapter device for use with a television apparatus, comprising:
a first interface over which audio-video content can be transferred to a television apparatus;
a second interface paired with said first interface which enables communication with the television apparatus for controlling operation of said device through the television apparatus;
wherein said first interface and said second interface provide secure communications interfacing when the personality adapter device is engaged within a docking port or slot of the television apparatus;
wherein the combination of said interface and said second interface cooperate in authorizing multimedia content transfers across the secure communications interface to prevent unlicensed materials from being output by the personality adapter and/or being accepted by the television apparatus;
a configuration template stored in memory in said personality adapter device;
wherein said configuration template can be transferred to said television apparatus over at least one of said first interface and second interface for automatic reconfiguration of a menu in the television apparatus in response to connection of said personality adapter device to the television apparatus;
wherein operation of said personality adapter device can be controlled and audio-video content from said personality adapter device can be accessed through said menu;
a high definition multimedia interface (HDMI) interface included in the first interface;
a universal serial bus (USB) included in the second interface; and
means for verifying that a single television apparatus is connected to both said HDMI and USB interfaces, wherein spoofing of protected-content security measures is prevented.

\* \* \* \* \*